US012506237B2

(12) United States Patent
Shi et al.

(10) Patent No.: US 12,506,237 B2
(45) Date of Patent: Dec. 23, 2025

(54) PHASE SHIFTER COMPRISING A SUBSTRATE HAVING A SIGNAL LINE AND GROUND WIRES, WHERE CAPACITANCE BRIDGES OF DIFFERENT BENDING STIFFNESS SPAN THE SIGNAL LINE

(71) Applicants: Beijing BOE Technology Development Co., Ltd., Beijing (CN); BOE Technology Group Co., Ltd., Beijing (CN)

(72) Inventors: Yingli Shi, Beijing (CN); Yanzhao Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 282 days.

(21) Appl. No.: 18/042,707

(22) PCT Filed: Apr. 18, 2022

(86) PCT No.: PCT/CN2022/087396
§ 371 (c)(1),
(2) Date: Feb. 23, 2023

(87) PCT Pub. No.: WO2023/201466
PCT Pub. Date: Oct. 26, 2023

(65) Prior Publication Data
US 2024/0291125 A1 Aug. 29, 2024

(51) Int. Cl.
*H01P 1/18* (2006.01)

(52) U.S. Cl.
CPC .................................... *H01P 1/184* (2013.01)

(58) Field of Classification Search
CPC .................................. H01P 1/184; H01P 1/18
(Continued)

(56) References Cited

U.S. PATENT DOCUMENTS

2004/0155729 A1 8/2004 Ko et al.
2005/0212705 A1* 9/2005 Legay et al. .............. H01P 1/18 343/700 MS
(Continued)

FOREIGN PATENT DOCUMENTS

CN 101143706 A 3/2008
CN 101246981 A 8/2008
(Continued)

*Primary Examiner* — Benny T Lee
(74) *Attorney, Agent, or Firm* — Workman Nydegger

(57) ABSTRACT

Provides are a phase shifter and a communication apparatus. The phase shifter includes a substrate; a signal transmission line on one side of the substrate; a first ground wire and a second ground wire on the same side of the substrate as the signal transmission line, the first and second ground wires are on two sides of the signal transmission line; and capacitance bridges on one side away from the substrate, of a layer where the signal transmission line is, the capacitance bridges are connected with the first and second ground wires, the capacitance bridges span the signal transmission line and are sequentially arrayed in an extension direction of signal transmission line, there is a gap between the capacitance bridges and the signal transmission line in a direction perpendicular to substrate, critical bias voltages are different when capacitance between the capacitance bridges and the signal transmission line reaches the maximum.

22 Claims, 12 Drawing Sheets

(58) Field of Classification Search
USPC .......................................................... 333/161
See application file for complete search history.

(56) References Cited

U.S. PATENT DOCUMENTS

| | | | | |
|---|---|---|---|---|
| 2008/0272857 | A1* | 11/2008 | Singh ...................... | H01P 1/184<br>333/161 |
| 2020/0102213 | A1 | 4/2020 | Haridas et al. | |
| 2022/0238974 | A1 | 7/2022 | Li et al. | |

FOREIGN PATENT DOCUMENTS

| | | | |
|---|---|---|---|
| CN | 101694896 | A | 4/2010 |
| CN | 102509816 | A | 6/2012 |
| CN | 103280615 | A | 9/2013 |
| CN | 110047662 | A | 7/2019 |
| CN | 215497017 | U | 1/2022 |
| CN | 114300821 | A | 4/2022 |

* cited by examiner

PHASE SHIFTER COMPRISING A SUBSTRATE HAVING A SIGNAL LINE AND GROUND WIRES, WHERE CAPACITANCE BRIDGES OF DIFFERENT BENDING STIFFNESS SPAN THE SIGNAL LINE

CROSS-REFERENCE TO RELATED APPLICATION

This application is a National Stage of International Application No. PCT/CN2022/087396, filed Apr. 18, 2022, which is hereby incorporated by reference in its entirety.

FIELD

The present disclosure relates to the technical field of Micro-Electro-Mechanical System, in particular to a phase shifter and a communication apparatus.

BACKGROUND

A phase shifter can adjust phases of a wave, and has a wide range of application in radars, missile attitude control, accelerators, communications, instrumentation and even music and other fields. In a traditional phase shifter, a silicon diode, a field effect transistor or a ferrite device is often used as a main component. However, the traditional phase shifter has the disadvantages of high power consumption, high insertion loss, poor reliability, high cost and the like. A radio-frequency Micro-Electro-Mechanical System (RF MEMS) phase shifter has the obvious advantages of small size, small loss, low cost, wide frequency band, easy integration and the like that the traditional phase shifter cannot be compared. Therefore, the research and development of the RF MEMS phase shifter is of great significance.

SUMMARY OF THE INVENTION

Embodiments of the present disclosure provide a phase shifter and a communication apparatus, and a specific solution is as follows.

In an aspect, an embodiment of the present disclosure provides a phase shifter, including: a substrate; a signal transmission line, located on one side of the substrate; a first ground wire and a second ground wire, located on the same side of the substrate as the signal transmission line, wherein the first ground wire and the second ground wire are located on two sides of the signal transmission line separately; and a plurality of capacitance bridges, located on one side, away from the substrate, of a layer where the signal transmission line is located, wherein the plurality of capacitance bridges are connected with the first ground wire and the second ground wire respectively, the plurality of capacitance bridges span the signal transmission line and are sequentially arrayed in an extension direction of the signal transmission line, in a direction perpendicular to the substrate, the plurality of capacitance bridges and the signal transmission line have gaps, and critical bias voltages are different when capacitance between the different capacitance bridges and the signal transmission line reaches the maximum.

In the above phase shifter provided by embodiments of the present disclosure, the capacitance bridges include bridge portions, the bridge portions span the signal transmission line, bending stiffness of at least part of the bridge portions is different, and the critical bias voltages corresponding to the capacitance bridges are greater with respect to the bending stiffness of the bridge portions.

In the above phase shifter provided by embodiments of the present disclosure, the bending stiffness of the at least part of the bridge portions which are sequentially arrayed in the extension direction of the signal transmission line changes monotonously.

In the above phase shifter provided by embodiments of the present disclosure, each of the at least part of the bridge portions respectively includes at least one hollowed-out structure, and total hollowed-out areas of the hollowed-out structures contained in the different bridge portions are different; and the bending stiffness of the bridge portions is lesser with respect to the total hollowed-out areas of the bridge portions, and the critical bias voltages corresponding to the capacitance bridges are lesser with respect to the total hollowed-out areas of the bridge portions.

In the above phase shifter provided by embodiments of the present disclosure, the total hollowed-out areas of the at least part of the bridge portions which are sequentially arrayed in the extension direction of the signal transmission line change monotonously.

In the above phase shifter provided by embodiments of the present disclosure, a ratio of the total hollowed-out areas of the two adjacent bridge portions having the hollowed-out structures is n/(n+1) or (n+1)/n, where, n is a positive integer.

In the above phase shifter provided by embodiments of the present disclosure, an orthographic projection of each hollowed-out structure on the substrate does not overlap an orthographic projection of the signal transmission line on the substrate.

In the above phase shifter provided by embodiments of the present disclosure, the orthographic projection of each hollowed-out structure on the substrate is symmetrically arranged with respect to the extension direction of the signal transmission line.

In the above phase shifter provided by embodiments of the present disclosure, an orthographic projection of each hollowed-out structure on the substrate is located within an orthographic projection of a gap between the signal transmission line and the first ground wire on the substrate, and/or, the orthographic projection of each hollowed-out structure on the substrate is located within an orthographic projection of a gap between the signal transmission line and the second ground wire on the substrate.

In the above phase shifter provided by embodiments of the present disclosure, in the extension direction of the signal transmission line, a width of each hollowed-out structure is smaller than or equal to 4/5 of a width of each bridge portion; and a length of each hollowed-out structure in an extension direction of the bridge portions is smaller than or equal to an interval between the signal transmission line and the first ground wire or the second ground wire.

In the above phase shifter provided by embodiments of the present disclosure, one of the bridge portions is not provided with the hollowed-out structure, and the other bridge portions are all provided with the hollowed-out structures.

In the above phase shifter provided by embodiments of the present disclosure, Young's modulus of materials used for at least part of the capacitance bridges is different; and the bending stiffness of the bridge portions is greater with respect to the Young's modulus of the materials used for the capacitance bridges, and the critical bias voltages corresponding to the capacitance bridges are greater with respect to the Young's modulus of the materials used for the capacitance bridges.

In the above phase shifter provided by embodiments of the present disclosure, the Young's modulus of the materials used for the at least part of the capacitance bridges which are sequentially arrayed in the extension direction of the signal transmission line changes monotonously.

In the above phase shifter provided by embodiments of the present disclosure, the materials used for each capacitance bridge whose Young's modulus increases sequentially are selected in an order of aluminum (Al), silver, gold, copper, platinum (Pt) and iron.

In the above phase shifter provided by embodiments of the present disclosure, widths of the at least part of the bridge portions in the extension direction of the signal transmission line are different; and the bending stiffness of the bridge portions is greater with respect to the widths of the bridge portions, and the critical bias voltages corresponding to the capacitance bridges are greater with respect to the widths of the bridge portions.

In the above phase shifter provided by embodiments of the present disclosure, the widths of the at least part of the bridge portions which are sequentially arrayed in the extension direction of the signal transmission line change monotonously.

In the above phase shifter provided by embodiments of the present disclosure, a ratio of the widths of the two adjacent bridge portions with different widths is greater than or equal to 6/5 or smaller than or equal to 5/6.

In the above phase shifter provided by embodiments of the present disclosure, a width of the narrowest bridge portion is greater than or equal to 10 μm, and a width of the widest bridge portion is smaller than or equal to 60 μm.

In the above phase shifter provided by embodiments of the present disclosure, lengths of the at least part of the bridge portions in the extension direction of the bridge portions are different; and the bending stiffness of the bridge portions is lesser with respect to the lengths of the bridge portions, and the critical bias voltages corresponding to the capacitance bridges are lesser with respect to the lengths of the bridge portions.

In the above phase shifter provided by embodiments of the present disclosure, the lengths of the at least part of the bridge portions which are sequentially arrayed in the extension direction of the signal transmission line change monotonously.

In the above phase shifter provided by embodiments of the present disclosure, a ratio of the lengths of the two adjacent bridge portions with different lengths is greater than or equal to 6/5 or smaller than or equal to 5/6.

In the above phase shifter provided by embodiments of the present disclosure, a length of the shortest bridge portion is greater than or equal to 100 μm, and a length of the longest bridge portion is smaller than or equal to 200 μm.

In the above phase shifter provided by embodiments of the present disclosure, thicknesses of the at least part of the bridge portions in the direction perpendicular to the substrate are different; and the bending stiffness of the bridge portions is greater with respect to the thicknesses of the bridge portions, and the critical bias voltages corresponding to the capacitance bridges are greater with respect to the thicknesses of the bridge portions.

In the above phase shifter provided by embodiments of the present disclosure, the thicknesses of the at least part of the bridge portions which are sequentially arrayed in the extension direction of the signal transmission line change monotonously.

In the above phase shifter provided by embodiments of the present disclosure, a ratio of the thicknesses of the two adjacent bridge portions with different thicknesses is greater than or equal to 11/10 or smaller than or equal to 10/11.

In the above phase shifter provided by embodiments of the present disclosure, a thickness of the thinnest bridge portion is greater than or equal to 0.3 μm, and a thickness of the thickest bridge portion is smaller than or equal to 5 μm.

In the above phase shifter provided by embodiments of the present disclosure, the capacitance bridges include the bridge portions and pier portions, the bridge portions are connected with the first ground wire and the second ground wire respectively through the pier portions, and heights of the pier portions of the at least part of the capacitance bridges in the direction perpendicular to the substrate are different; and the bending stiffness of the bridge portions is not correlated with the heights of the pier portions, and the critical bias voltages corresponding to the capacitance bridges are positively correlated with the heights of the pier portions.

In the above phase shifter provided by embodiments of the present disclosure, the heights of the at least part of the pier portions which are sequentially arrayed in the extension direction of the signal transmission line change monotonously.

In the above phase shifter provided by embodiments of the present disclosure, a ratio of the heights of the two adjacent pier portions with different heights is greater than or equal to 6/5 or smaller than or equal to 5/6.

In the above phase shifter provided by embodiments of the present disclosure, a height of the shortest pier portion is greater than or equal to 1 μm, and a height of the tallest pier portion is smaller than or equal to 5 μm.

In the above phase shifter provided by embodiments of the present disclosure, the bridge portions and the pier portions of the same capacitance bridge are integrally arranged.

In the above phase shifter provided by embodiments of the present disclosure, the signal transmission line, the first ground wire and the second ground wire are arranged on the same layer.

In some embodiments, the above phase shifter provided by the embodiment of the present disclosure further includes an isolation layer, located between the layer where the signal transmission line is located and a layer where the plurality of capacitance bridges are located, wherein an orthographic projection of the isolation layer on the substrate approximately coincides with the orthographic projection of the signal transmission line on the substrate.

In the above phase shifter provided by embodiments of the present disclosure, the substrate is a flexible substrate.

In the other aspect, an embodiment of the present disclosure provides the above phase shifter provided by the embodiment of the present disclosure.

DETAILED DESCRIPTION OF THE EMBODIMENTS

Figure 1:
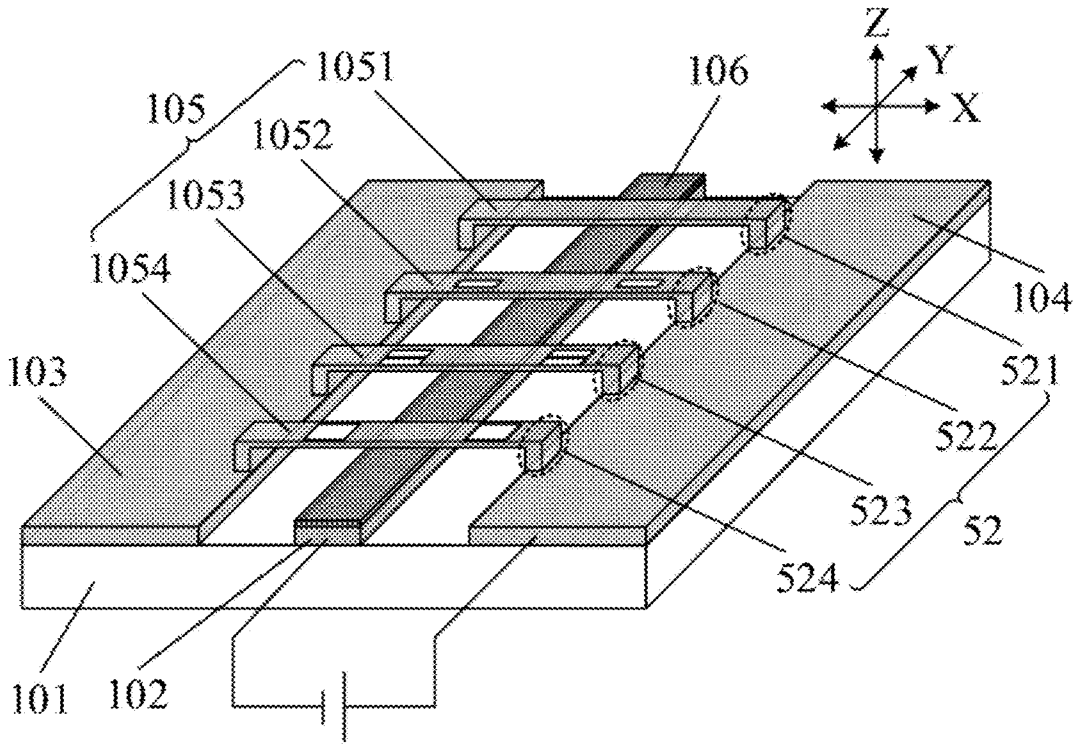
FIG. 1 is a schematic structural diagram of a phase shifter provided by an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions throughout the detail description of the drawings.

Unless otherwise defined, technical or scientific terms used herein shall have the ordinary meanings understood by those skilled in the art. The words "first", "second" and the similar words used in the specification and claims of the present disclosure do not indicate any order, quantity or importance, but are only used to distinguish different components. The words "comprise" or "include" and the like indicate that an element or item appearing before such word covers listed elements or items appearing after the word and equivalents thereof, and does not exclude other elements or items. "Inner", "outer", "upper" and "lower" and the like are only used to represent relative position relationships, and the relative position relationships may also change accordingly after an absolute position of a described object changes.

RF MEMS phase shifters may generally be divided into distributed phase shifters, reflective phase shifters and switch-line phase shifters. The distributed phase shifters are based on a signal transmission line which is periodically loaded with discrete variable capacitance, and phase shift is generated by increasing the distributed capacitance on the signal transmission line to reduce its phase speed. Specifically, in the related distributed phase shifters, a plurality of capacitance bridges arranged in parallel have the same structures and materials, and each capacitance bridge needs to be provided with a signal transmission line and a control circuit correspondingly to load different bias signals for the corresponding signal transmission lines through the control circuits (that is, passing multiple bias signals), so as to realize the control of the phase shift quantity of a radio-frequency signal. Because each capacitance bridge needs to be provided with the signal transmission line and the control circuit correspondingly, the structures of the distributed phase shifters are relatively complex.

In order to solve the above technical problems existing in the related art, an embodiment of the present disclosure provides a phase shifter, as shown in FIG. 1 to FIG. 4, including:

- a substrate 101;
- a signal transmission line 102, located on one side of the substrate 101;
- a first ground wire 103 and a second ground wire 104, located on the side of substrate 101 where the signal transmission line 102 is on, wherein the first ground wire 103 and the second ground wire 104 are located on two sides of the signal transmission line 102; and
- a plurality of capacitance bridges 105, located on one side, away from the substrate 101, of a layer where the signal transmission line 102 is on, wherein the plurality of capacitance bridges 105 are connected with the first ground wire 103 and the second ground wire 104 respectively, the plurality of capacitance bridges 105 span the signal transmission line 102 and are sequentially arrayed in an extension direction Y of the signal transmission line 102, in a direction Z perpendicular to the substrate 101, there are gaps between each of the plurality of capacitance bridges 105 and the signal transmission line 102, and critical bias voltages are different when capacitance between the different capacitance bridges 105 and the signal transmission line 102 reaches the maximum (equivalent to that an interval between the different capacitance bridges 105 and the signal transmission line 102 reaches the minimum).

In the present disclosure, each capacitance bridge 105 forms a switch with the substrate 101, the signal transmission line 102, the first ground wire 103 and the second ground wire 104. For a switch, when a critical bias voltage is not loaded on the signal transmission line 102, an interval between the signal transmission line 102 and the capacitance bridge 105 is larger, and capacitance between the signal transmission line 102 and the capacitance bridge 105 is very small, a radio-frequency signal may be transmitted along the signal transmission line 102, and the switch is in an on-state at this time. When the critical bias voltage is loaded on the signal transmission line 102, the capacitance bridge 105 is pulled down to be in contact with an isolation layer 106 under an action of an electrostatic force, the maximum capacitance is formed between the capacitance bridge 105 and the signal transmission line 102, then the radio-frequency signal may be coupled to the first ground wire 103 and the second ground wire 104 through the capacitance bridge 105, and the switch is in an off-state at this time. After removing the bias voltage, the capacitance bridge 105 may return to an initial position due to its own elasticity, and the radio-frequency signal may be transmitted continuously along the signal transmission line 102.

A phase-shifting principle of the switch for the radio-frequency signal is that the signal transmission line 102, the first ground wire 103 and the second ground wire 104 form a coplanar waveguide transmission line. After the capacitance bridge 105 is pulled down by the electrostatic force to generate deformation, a distance between the capacitance bridge and the signal transmission line 102 changes, which causes the capacitance between the signal transmission line 102 and the capacitance bridge 105 to change, thereby changing a characteristic impedance and a transmission coefficient of the coplanar waveguide transmission line, thus resulting in the change in a transmission rate of the radio-frequency signal transmitted on the coplanar waveguide transmission line. After the transmission rate of the radio-frequency signal changes, its phase changes along with the change in the transmission rate, so that phase shift of the switch for the radio-frequency signal is realized. The combination of different on-off states of a plurality of switches in the phase shifter determines different phase shift quantities of the radio-frequency signal.

In the above phase shifter provided by some embodiments of the present disclosure, different capacitance bridges 105 have different critical electrostatic drive response characteristics by setting different critical bias voltages when the capacitance between the different capacitance bridges 105 and the same signal transmission line 102 reaches the maximum. That is, for the same bias voltage loaded on the signal transmission line 102, the different capacitance bridges 105 may generate different drive responses. For example, under the same bias voltage, the capacitance bridge 105 with a low critical bias voltage is pulled down to a lowest position and is in the off-state, and the capacitance bridge 105 with a high critical bias voltage cannot be pulled down to the lowest position and is in the on-state. As the bias voltage on the signal transmission line 102 changes, the capacitance bridges 105 in the phase shifter may be driven one by one. Based on this, by applying different bias voltages to the signal transmission line 102 spanned by each capacitance bridge 105 together, the drive response of each capacitance bridge 105 may be controlled. Different on-off state combinations in the phase shifter correspond to different phase shift quantities, and thus the phase shifter may control the phase shift quantity of the radio-frequency signal by adjusting the bias voltages on the signal transmission line 102. Therefore, the need to arrange the signal transmission line 102 and a control circuit for each capacitance bridge 105 in a traditional phase shifter is eliminated, and the structure of the phase shifter is simplified.

Figure 2:
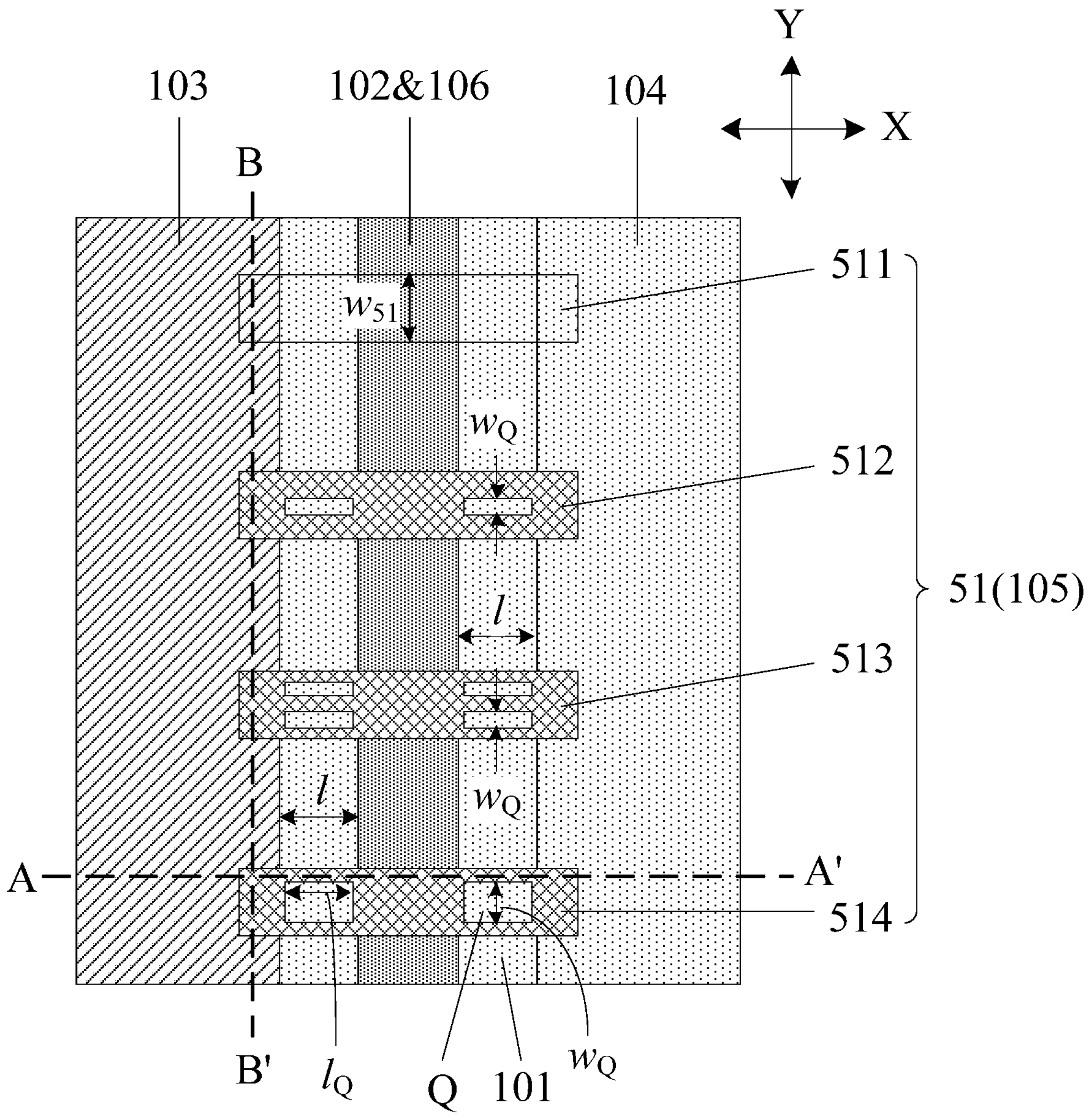
FIG. 2 is a top view of the phase shifter shown in FIG. 1.

For example, a situation that a phase shifter shown in FIG. 1 and FIG. 2 controls different phase shift quantities of a radio-frequency signal is taken as an example for illustration. Optionally, in FIG. 1 and FIG. 2, four capacitance bridges 105 in an extension direction of a signal transmission line 102 are sequentially marked as a first capacitance bridge 1051, a second capacitance bridge 1052, a third capacitance bridge 1053 and a fourth capacitance bridge 1054, and a critical bias voltage corresponding to the first capacitance bridge 1051, a critical bias voltage corresponding to the second capacitance bridge 1052, a critical bias voltage corresponding to the third capacitance bridge 1053 and a critical bias voltage corresponding to the fourth capacitance bridge 1054 are set to decrease sequentially.

Figure 5:
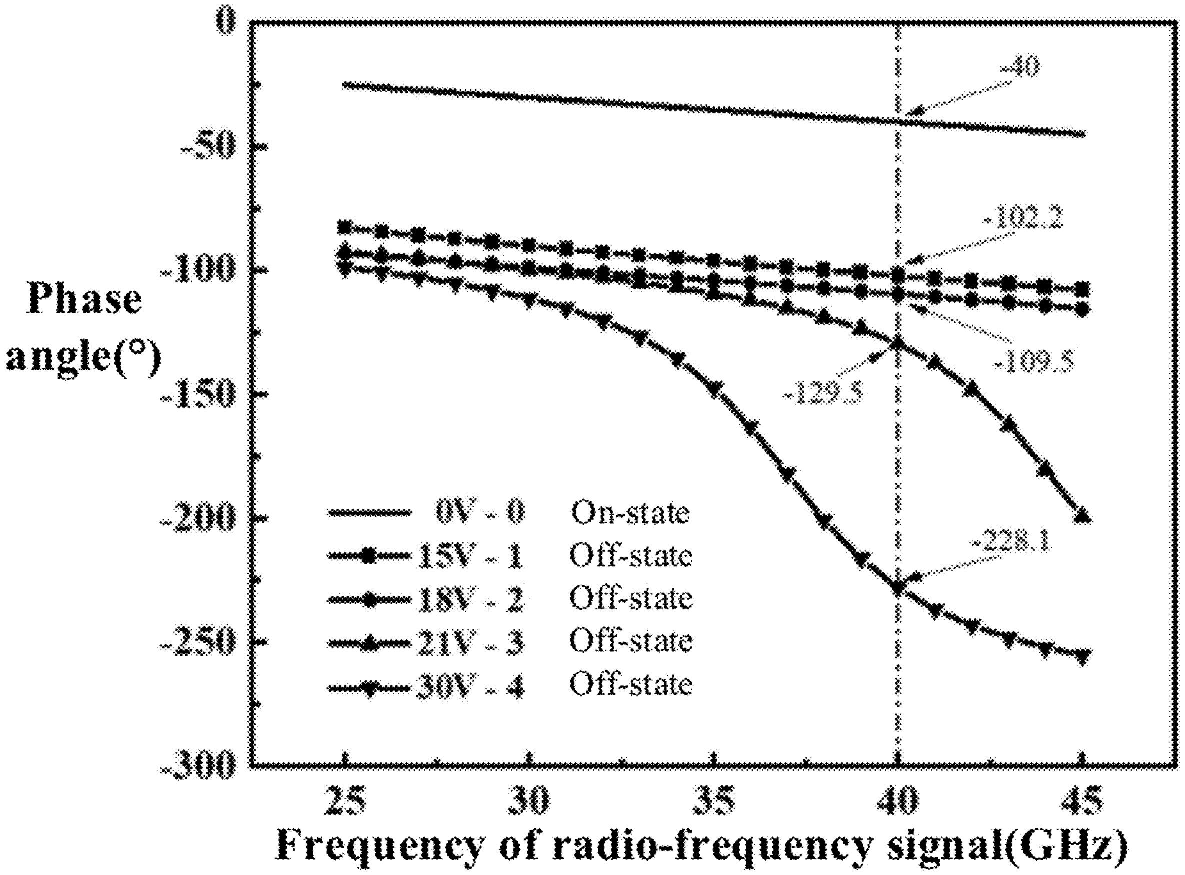
FIG. 5 is a phase shift characteristic curve of a phase shifter provided by an embodiment of the present disclosure.

As shown in FIG. 5, a radio-frequency signal of 40 GHz is taken as an example, when the bias voltage on the signal transmission line 102 is 0 V, a switch containing the first capacitance bridge 1051, a switch containing the second capacitance bridge 1052, a switch containing the third capacitance bridge 1053 and a switch containing the fourth capacitance bridge 1054 are all in the on-state, and a phase angle of the radio-frequency signal passing the phase shifter is −40°.

Continuing to refer to FIG. 5, when the bias voltage on the signal transmission line 102 is 15 V, the fourth capacitance bridge 1054 is pulled down to a state of being in contact with an isolation layer 106 from a flat state, the capacitance between the fourth capacitance bridge 1054 and the signal transmission line 102 reaches the maximum, and the switch containing the fourth capacitance bridge 1054 is turned from the on state to the off-state. However, the switch containing the first capacitance bridge 1051, the switch containing the second capacitance bridge 1052 and the switch containing the third capacitance bridge 1053 are all kept in the on-state without state changes. In this case, the phase angle of the radio-frequency signal passing the phase shifter is −102.2°.

Continuing to refer to FIG. 5, when the bias voltage on the signal transmission line 102 is 18 V, the third capacitance bridge 1053 and the fourth capacitance bridge 1054 are pulled down to the state of being in contact with the isolation layer 106 from the flat state, the capacitance between the third capacitance bridge 1053 and the signal transmission line 102, and between the fourth capacitance bridge 1054 and the signal transmission line 102 reaches the maximum, and the switch containing the third capacitance bridge 1053 and the switch containing the fourth capacitance bridge 1054 are turned from the on-state at 0 V to the off-state. However, the switch containing the first capacitance bridge 1051 and the switch containing the second capacitance bridge 1052 are both kept in the on-state. In this case, the phase angle of the radio-frequency signal passing the phase shifter is −109.5°.

Continuing to refer to FIG. 5, when the bias voltage on the signal transmission line 102 is 21 V, the fourth capacitance bridge 1054, the third capacitance bridge 1053 and the second capacitance bridge 1052 are pulled down to the state of being in contact with the isolation layer 106 from the flat state, the capacitance between the fourth capacitance bridge 1054 and the signal transmission line 102, between the third capacitance bridge 1053 and the signal transmission line 102, and between the second capacitance bridge 1052 and the signal transmission line 102 respectively reaches the maximum, and the switch containing the fourth capacitance bridge 1054, the switching containing the third capacitance bridge 1053 and the switch containing the second capacitance bridge 1052 are all turned from the on-state at 0 V to the off-state. However, the switch containing the first capacitance bridge 1051 is still kept in the on-state. In this case, the phase angle of the radio-frequency signal passing the phase shifter is −129.5°.

Continuing to refer to FIG. 5, when the bias voltage on the signal transmission line 102 is 30 V, the first capacitance bridge 1051, the second capacitance bridge 1052, the third capacitance bridge 1053 and the fourth capacitance bridge 1054 are pulled down to the state of being in contact with the isolation layer 106 from the flat state, the capacitance between the first capacitance bridge 1051 and the signal transmission line 102, between the second capacitance bridge 1052 and the signal transmission line 102, between the third capacitance bridge 1053 and the signal transmission line 102, and between the fourth capacitance bridge 1054 and the signal transmission line 102 all reaches the maximum, and the switch containing the fourth capacitance bridge 1054, the switch containing the third capacitance bridge 1053, the switch containing the second capacitance bridge 1052 and the switch containing the first capacitance bridge 1051 are all turned from the on-state at 0 V to the off-state. In this case, the phase angle of the radio-frequency signal passing the phase shifter is −228.1°.

It can be seen that under the drive of different bias voltages, the phase angle of the radio-frequency signal passing the phase shifter changes as shown in FIG. 5. It can be seen that under the effect of different bias voltages, the phase shifter has a significant regulating effect on the phase angle of the radio-frequency signal. Therefore, the phase shifter based on bias voltage control proposed in the present disclosure has a phase shift effect that changes with the bias voltage.

Figure 3:
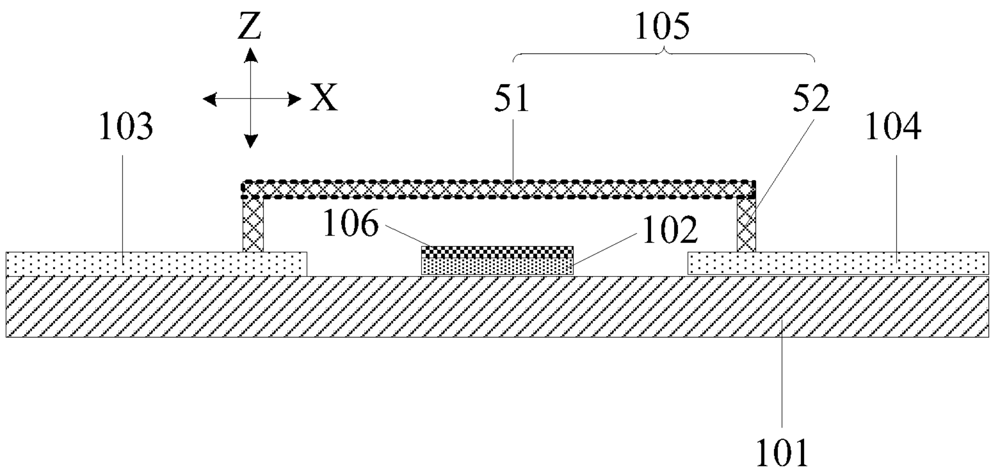
FIG. 3 is a cross-sectional view along a line A-A' in FIG. 2.
Figure 4:
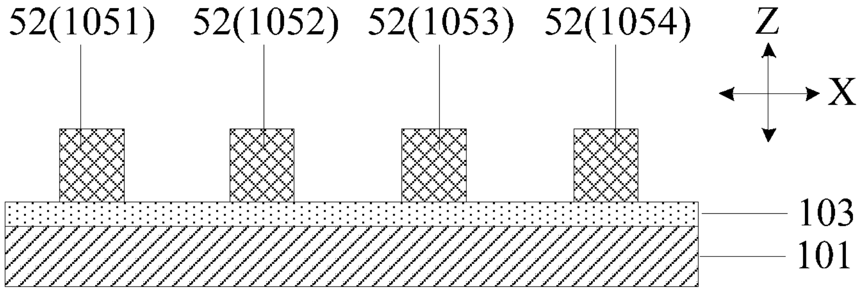
FIG. 4 is a cross-sectional view along a line B-B' in FIG. 2.

In the above phase shifter provided by embodiments of the present disclosure, as shown in FIG. 2 and FIG. 3, the capacitance bridges 105 include bridge portions 51, the bridge portions 51 span the signal transmission line 102, and the bridge portions 51 of at least part of the capacitance bridges 105 have different bending stiffness. Optionally, the bridge portions 51 of all capacitance bridges 105 have different bending stiffness, and by adjusting the bending stiffness of different bridge portions 51, the different capacitance bridges 105 have different critical electrostatic drive response characteristics. In some embodiments, the critical bias voltage controlling the bending of the capacitance bridge 105 to the signal transmission line 102 is greater with respect to the bending stiffness of the bridge portions 51, that is, the smaller the bending stiffness of the bridge portions 51, the smaller the critical bias voltage controlling the bending of the capacitance bridge 105 to the signal transmission line 102, the greater the bending stiffness of the bridge portions 51, and the greater the critical bias voltage controlling the bending of the capacitance bridge 105 to the signal transmission line 102. Optionally, the bending stiffness of the above at least part of the bridge portions 51 which are sequentially arrayed in an extension direction Y of the signal transmission line 102 may change monotonously in an increasing or decreasing manner.

In the above phase shifter provided by embodiments of the present disclosure, as shown in FIG. 1 and FIG. 2, in order to make the bending stiffness of bridge portions 51 different, each of the at least part of the bridge portions 51 may be provided with at least one hollowed-out structure Q, so that total hollowed-out areas of the hollowed-out structures Q contained in the bridge portions 51 are different. Specifically, the hollowed-out structures Q may reduce solid widths of the bridge portions 51, which is equivalent to that equivalent widths of the bridge portions 51 decrease, so as to reduce the bending stiffness of the bridge portions 51. In addition, the greater the total hollowed-out areas of the bridge portions 51, the smaller the equivalent widths of the bridge portions 51, the smaller the bending stiffness of the bridge portions 51, and the smaller the critical bias voltage controlling the bending of the capacitance bridge 105 to the signal transmission line 102. That is, the bending stiffness of the bridge portions 51 is lesser with respect to the total hollowed-out areas of the bridge portions 51, and the critical bias voltages corresponding to the capacitance bridges 105 are also lesser with respect to the total hollowed-out areas of the bridge portions 51. Optionally, a shape of an orthographic projection of each hollowed-out structure Q may be a rectangle, a square, a rhombus, a circle or other polygons, which is not limited here.

In the above phase shifter provided by embodiments of the present disclosure, the total hollowed-out area of each bridge portion 51 having the hollowed-out structures Q arranged sequentially in the extension direction Y of the signal transmission line 102 may change monotonously. For example, the total hollowed-out area of each bridge portion 51 having the hollowed-out structures Q arranged sequentially in the extension direction Y of the signal transmission line 102 may increase progressively. For another example, the total hollowed-out area of each bridge portion 51 having the hollowed-out structures Q arranged sequentially in the extension direction Y of the signal transmission line 102 may decrease progressively. Optionally, a ratio of the total hollowed-out areas of the two adjacent bridge portions 51 having the hollowed-out structures Q may be n/(n+1) or (n+1)/n, where, n is a positive integer.

In the above phase shifter provided by embodiments of the present disclosure, all bridge portions 51 may be provided with the hollowed-out structures Q, so that the total hollowed-out areas of the hollowed-out structures Q contained in the different bridge portions 51 are different. Alternatively, in order to simplify setting and reduce the fracture risk of the bridge portion 51 with a largest total hollowed-out area, as shown in FIG. 1 and FIG. 2, it may be set that one bridge portion 51 does not contain the hollowed-out structures Q, the other bridge portions 51 all contain the hollowed-out structures Q, and the total hollowed-out areas of the hollowed-out structures Q contained in the other bridge portions 51 are different. Taking four bridge portions 51 in FIG. 1 and FIG. 2 as an example, the bridge portions 51 contained in the first capacitance bridge 1051, the second capacitance bridge 1052, the third capacitance bridge 1053 and the fourth capacitance bridge 1054 may be sequentially marked as a first bridge portion 511, a second bridge portion 512, a third bridge portion 513 and a fourth bridge portion 514. Optionally, the first bridge portion 511 is not provided with the hollowed-out structures Q, the second bridge portion 512, the third bridge portion 513 and the fourth bridge portion 514 are all provided with the hollowed-out structures Q, and the total hollowed-out area of the second bridge portion 512, the total hollowed-out area of the third bridge portion 513 and the total hollowed-out area of the fourth bridge portion 514 increase sequentially, which is equivalent to that the total hollowed-out area of the fourth bridge portion 514, the total hollowed-out area of the third bridge portion 513 and the total hollowed-out area of the second bridge portion 512 decrease sequentially. For example, the total hollowed-out area of the third bridge portion 513 is twice that of the second bridge portion 512 (it is equivalent to that a ratio of the total hollowed-out area of the second bridge portion 512 to the total hollowed-out area of the third bridge portion 513 is 1/2), and the total hollowed-out area of the fourth bridge portion 514 is three times that of the second bridge portion 512 (it is equivalent to that a ratio of the total hollowed-out area of the fourth bridge portion 514 to the total hollowed-out area of the third bridge portion 513 is 3/2, and a ratio of the total hollowed-out area of the third bridge portion 513 to the total hollowed-out area of the fourth bridge portion 514 is 2/3). Of course, in some embodiments, the size ratio of the total hollowed-out areas of different bridge portions 51 may be other ratios, as long as the sizes of the total hollowed-out areas of different bridge portions 51 are different. In a case that the total hollowed-out area of the second bridge portion 512, the total hollowed-out area of the third bridge portion 513 and the total hollowed-out area of the fourth bridge portion 514 increase sequentially, the bending stiffness of the first capacitance bridge 1051, the bending stiffness of the second capacitance bridge 1052, the bending stiffness of the third capacitance bridge 1053 and the bending stiffness of the fourth capacitance bridge 1054 decrease sequentially, and the critical bias voltage corresponding to the first capacitance bridge 1051, the critical bias voltage corresponding to the second capacitance bridge 1052, the critical bias voltage corresponding to the third capacitance bridge 1053 and the critical bias voltage corresponding to the fourth capacitance bridge 1054 also decrease sequentially.

In the above phase shifter provided by embodiments of the present disclosure, as shown in FIG. 1 and FIG. 2, an orthographic projection of each hollowed-out structure Q on the substrate 101 may not overlap an orthographic projection of the signal transmission line 102 on the substrate 101, so as to ensure an opposite area of the bridge portions 51 and the signal transmission line 102. Optionally, the orthographic projection of each hollowed-out structure Q on the substrate 101 may be located within an orthographic projection of a gap between the signal transmission line 102 and the first ground wire 103 on the substrate 101, and/or, located within an orthographic projection of a gap between the signal transmission line 102 and the second ground wire 104 on the substrate 101. In some embodiments, as shown in FIG. 1 and FIG. 2, in a case that one bridge portion 51 includes a plurality of hollowed-out structures Q, each hollowed-out structure Q of each bridge portion 51 may be symmetrically arranged with respect to the extension direction Y of the signal transmission line 102, so as to avoid that when the plurality of hollowed-out structures Q are arranged on a single side in the extension direction Y of the signal transmission line 102, the equivalent widths of the bridge portions 51 at the hollowed-out structures Q are small, which increases the risk of fracture of the bridge portions 51 during bending deformation under an action of an electrostatic force.

In the above phase shifter provided by embodiments of the present disclosure, as shown in FIG. 2, in order to ensure the bending stiffness of the bridge portions 51 and reduce the fracture risk of the bridge portions 51, it may be set that a width $w_Q$ of each hollowed-out structure Q in the extension direction Y of the signal transmission line 102 is smaller than or equal to 4/5 of a width $w_{51}$ of each bridge portion 51. A length $l_Q$ of each hollowed-out structure Q in an extension direction X of the bridge portions 51 may be smaller than or equal to an interval l between the signal transmission line 102 and the first ground wire 103 or the second ground wire 104.

Figure 6:
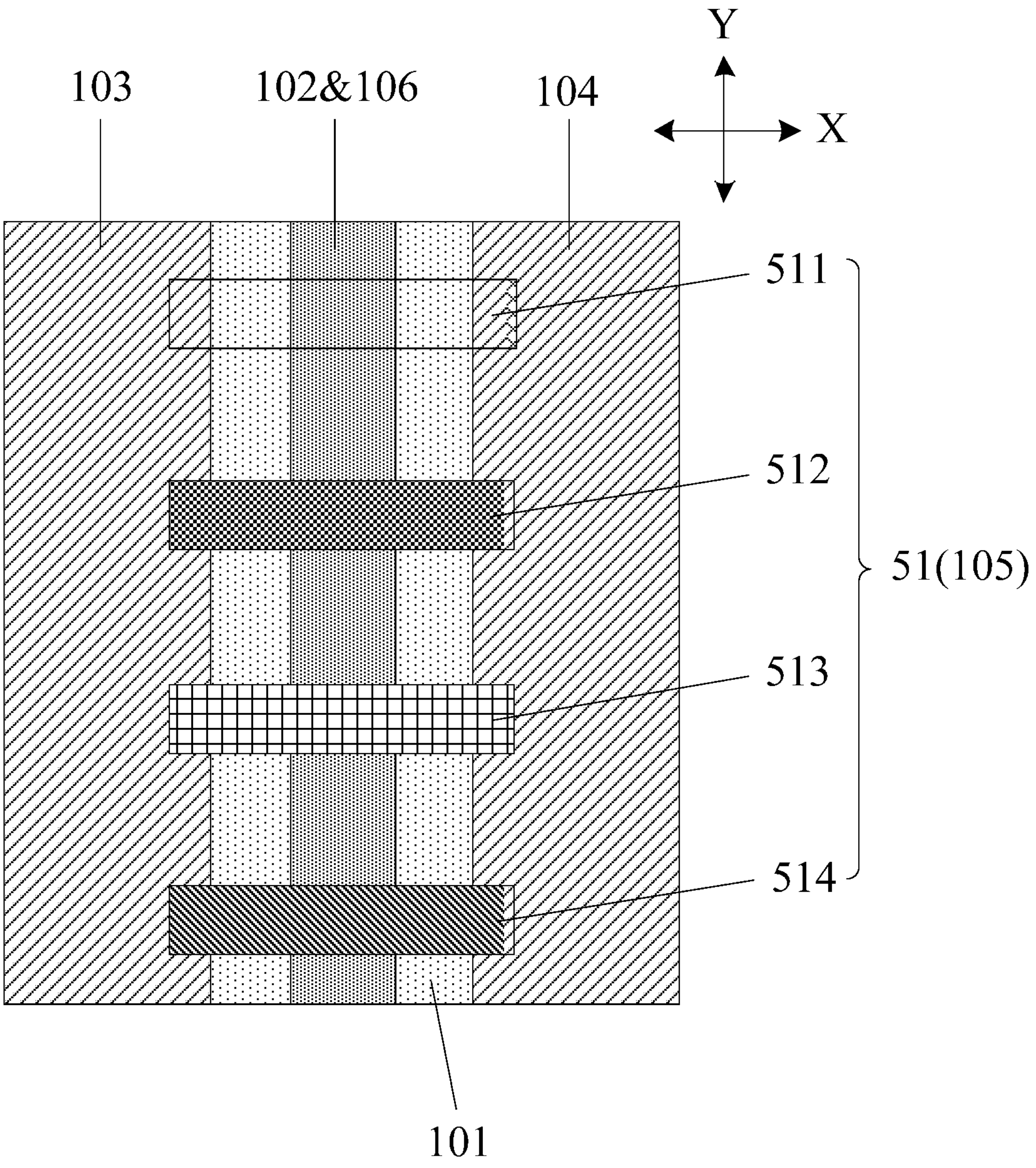
FIG. 6 is another schematic structural diagram of a phase shifter provided by an embodiment of the present disclosure.

In the above phase shifter provided by embodiments of the present disclosure, as shown in FIG. 6, it may be set that Young's modulus of materials used for at least part of the capacitance bridges 105 may be different. Optionally, the Young's modulus of the materials used for all capacitance bridges 105 may be all different, so as to make the bending stiffness of different bridge portions 51 different. In a case that the capacitance bridges 105 are different only in the materials, the bending stiffness of the capacitance bridges 105 is greater with respect to the Young's modulus of the materials used for the capacitance bridges, and the critical bias voltages controlling the bending of the capacitance bridges 105 to the signal transmission line 102 are greater with respect to the Young's modulus of the materials used for the capacitance bridges 105. Optionally, the Young's modulus of the materials used for the capacitance bridges 105 with different materials arranged sequentially in the extension direction Y of the signal transmission line 102 may change monotonously in an increasing or decreasing manner. In some embodiments, the materials used for each capacitance bridge 105 whose Young's modulus increases sequentially are selected in an order of aluminum (Al), silver, gold, copper, platinum (Pt) and iron. For example, the Young's modulus of the material of the first capacitance bridge 1051, the material of the second capacitance bridge 1052, the material of the third capacitance bridge 1053 and the material of the fourth capacitance bridge 1054 increases sequentially, then the material of the first capacitance bridge 1051, the material of the second capacitance bridge 1052, the material of the third capacitance bridge 1053 and the material of the fourth capacitance bridge 1054 may sequentially be aluminum (Al), silver, copper and iron, or sequentially be aluminum (Al), silver, copper and platinum (Pt), or sequentially be aluminum (Al), silver, gold and platinum (Pt), and the like. Accordingly, the bending stiffness of the first capacitance bridge 1051, the bending stiffness of the second capacitance bridge 1052, the bending stiffness of the third capacitance bridge 1053 and the bending stiffness of the fourth capacitance bridge 1054 increase sequentially, and the critical bias voltage corresponding to the first capacitance bridge 1051, the critical bias voltage corresponding to the second capacitance bridge 1052, the critical bias voltage corresponding to the third capacitance bridge 1053 and the critical bias voltage corresponding to the fourth capacitance bridge 1054 increase sequentially. During specific implementation, with the increase of the bias voltage on the signal transmission line 102, the first capacitance bridge 1051, the second capacitance bridge 1052, the third capacitance bridge 1053 and the fourth capacitance bridge 1054 sequentially generate pull-down drive responses.

Figure 7:
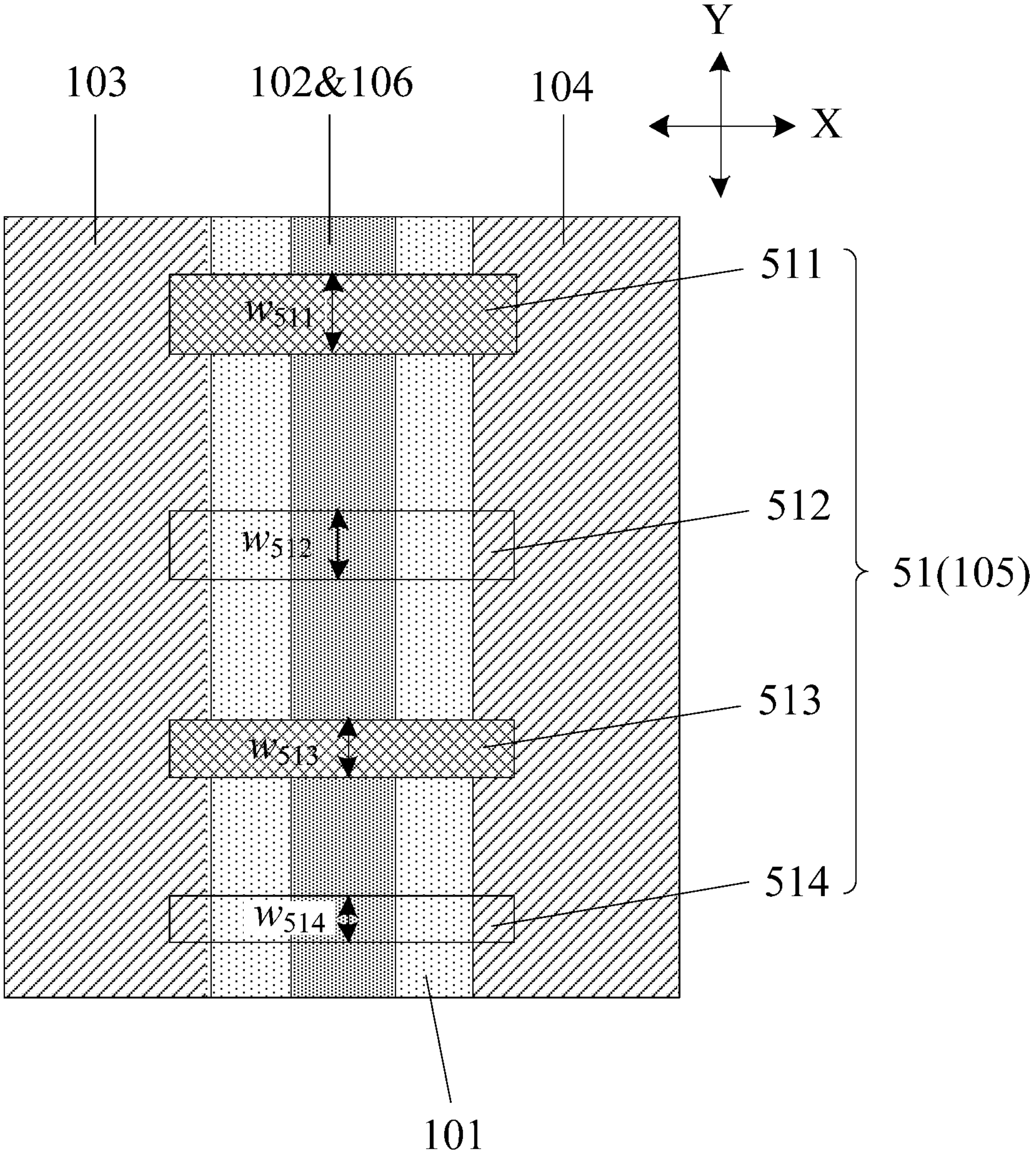
FIG. 7 is yet another schematic structural diagram of a phase shifter provided by an embodiment of the present disclosure.

In the above phase shifter provided by embodiments of the present disclosure, as shown in FIG. 7, it may further be set that widths of at least part of the bridge portions 51 in the extension direction Y of the signal transmission line 102 are different. Optionally, the widths of all bridge portions 51 are all different, so as to make the bending stiffness of different bridge portions 51 different. Specifically, in a case that only the width of the bridge portions 51 is a variable, the bending stiffness of the bridge portions 51 is greater with respect to the widths thereof, and the critical bias voltages controlling the bending of the bridge portions 51 to the signal transmission line 102 are greater with respect to the widths of the bridge portions 51.

In some embodiments, the widths of the bridge portions 51 with different widths arranged sequentially in the extension direction Y of the signal transmission line 102 may change monotonously. For example, in FIG. 7, a width $w_{511}$ of the first bridge portion 511, a width $w_{512}$ of the second bridge portion 512, a width $w_{513}$ of the third bridge portion 513 and a width $w_{514}$ of the fourth bridge portion 514 may decrease sequentially (it is equivalent to that the width $w_{514}$ of the fourth bridge portion 514, the width $w_{513}$ of the third bridge portion 513, the width $w_{512}$ of the second bridge portion 512 and the width $w_{511}$ of the first bridge portion 511 may increase sequentially). Accordingly, the bending stiffness of the first bridge portion 511, the bending stiffness of the second bridge portion 512, the bending stiffness of the third bridge portion 513 and the bending stiffness of the fourth bridge portion 514 decrease sequentially, and the critical bias voltage corresponding to the first bridge portion 511, the critical bias voltage corresponding to the second bridge portion 512, the critical bias voltage corresponding to the third bridge portion 513 and the critical bias voltage corresponding to the fourth bridge portion 514 decrease sequentially. During specific implementation, with the increase of the bias voltage on the signal transmission line 102, the fourth capacitance bridge 1054, the third capacitance bridge 1053, the second capacitance bridge 1052 and the first capacitance bridge 1051 sequentially generate pull-down drive responses.

Optionally, as shown in FIG. 7, a ratio of the widths of the two adjacent bridge portions 51 with different widths may be greater than or equal to 6/5 or smaller than or equal to 5/6.

For example, the width $w_{511}$ of the first bridge portion 511 may be greater than or equal to 6/5 times the width $w_{512}$ of the second bridge portion 512 (it is equivalent to that the width $w_{512}$ of the second bridge portion 512 may be smaller than or equal to 5/6 of the width $w_{511}$ of the first bridge portion 511), the width $w_{512}$ of the second bridge portion 512 may be greater than or equal to 6/5 times the width $w_{513}$ of the third bridge portion 513 (it is equivalent to that the width $w_{513}$ of the third bridge portion 513 may be smaller than or equal to 5/6 of the width $w_{512}$ of the second bridge portion 512), and the width $w_{513}$ of the third bridge portion 513 may be greater than or equal to 6/5 times the width $w_{514}$ of the fourth bridge portion 514 (it is equivalent to that the width $w_{514}$ of the fourth bridge portion 514 may be smaller than or equal to 5/6 of the width $w_{513}$ of the third bridge portion 513).

In some embodiments, as shown in FIG. 7, the width $w_{514}$ of the narrowest fourth bridge portion 514 may be greater than or equal to 10 μm, and the width $w_{511}$ of the widest first bridge portion 511 may be smaller than or equal to 60 μm. For example, the width $w_{514}$ of the fourth bridge portion 514 is equal to 10 μm, the width $w_{513}$ of the third bridge portion 513 is equal to 12 μm, the width $w_{512}$ of the second bridge portion 512 is equal to 14.4 μm, and the width $w_{511}$ of the first bridge portion 511 is equal to 17.28 μm; the width $w_{514}$ of the fourth bridge portion 514 is equal to 20 μm, the width $w_{513}$ of the third bridge portion 513 is equal to 24 μm, the width $w_{512}$ of the second bridge portion 512 is equal to 28.8 μm, and the width $w_{511}$ of the first bridge portion 511 is equal to 34.56 μm; the width $w_{514}$ of the fourth bridge of portion 514 is equal to 30 μm, the width $w_{513}$ of the third bridge portion 513 is equal to 36 μm, the width $w_{512}$ of the second bridge portion 512 is equal to 43.2 μm, and the width $w_{511}$ of the first bridge portion 511 is equal to 51.84 μm; and the width $w_{514}$ of the fourth bridge portion 514 is equal to 34.75 μm, the width $w_{513}$ of the third bridge portion 513 is equal to 41.7 μm, the width $w_{512}$ of the second bridge portion 512 is equal to 50 μm, and the width $w_{511}$ of the first bridge portion 511 is equal to 60 μm.

In the above phase shifter provided by embodiments of the present disclosure, in order to avoid mutual interference caused by coupling capacitance between the adjacent capacitance bridges 105, it may be set that the interval between the adjacent capacitance bridges 105 in the extension direction Y of the signal transmission line 102 is greater than or equal to twice the widths of the capacitance bridges 105. Optionally, in a case that the widths of the two adjacent capacitance bridges 105 are different, the interval between the adjacent capacitance bridges 105 in the extension direction Y of the signal transmission line 102 is greater than or equal to twice the width of the wider capacitance bridge 105.

Figure 8:
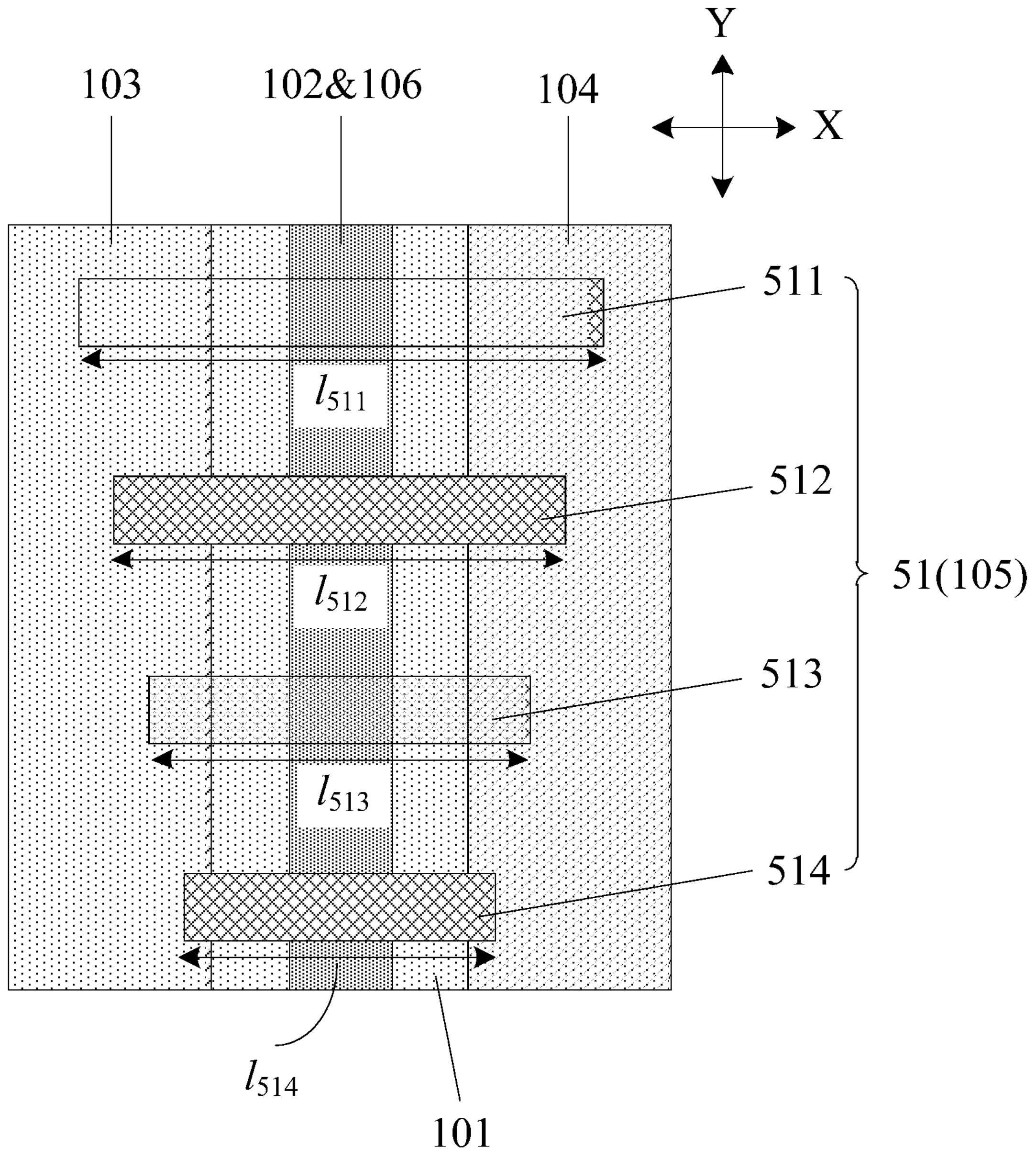
FIG. 8 is yet another schematic structural diagram of a phase shifter provided by an embodiment of the present disclosure.
Figure 9:
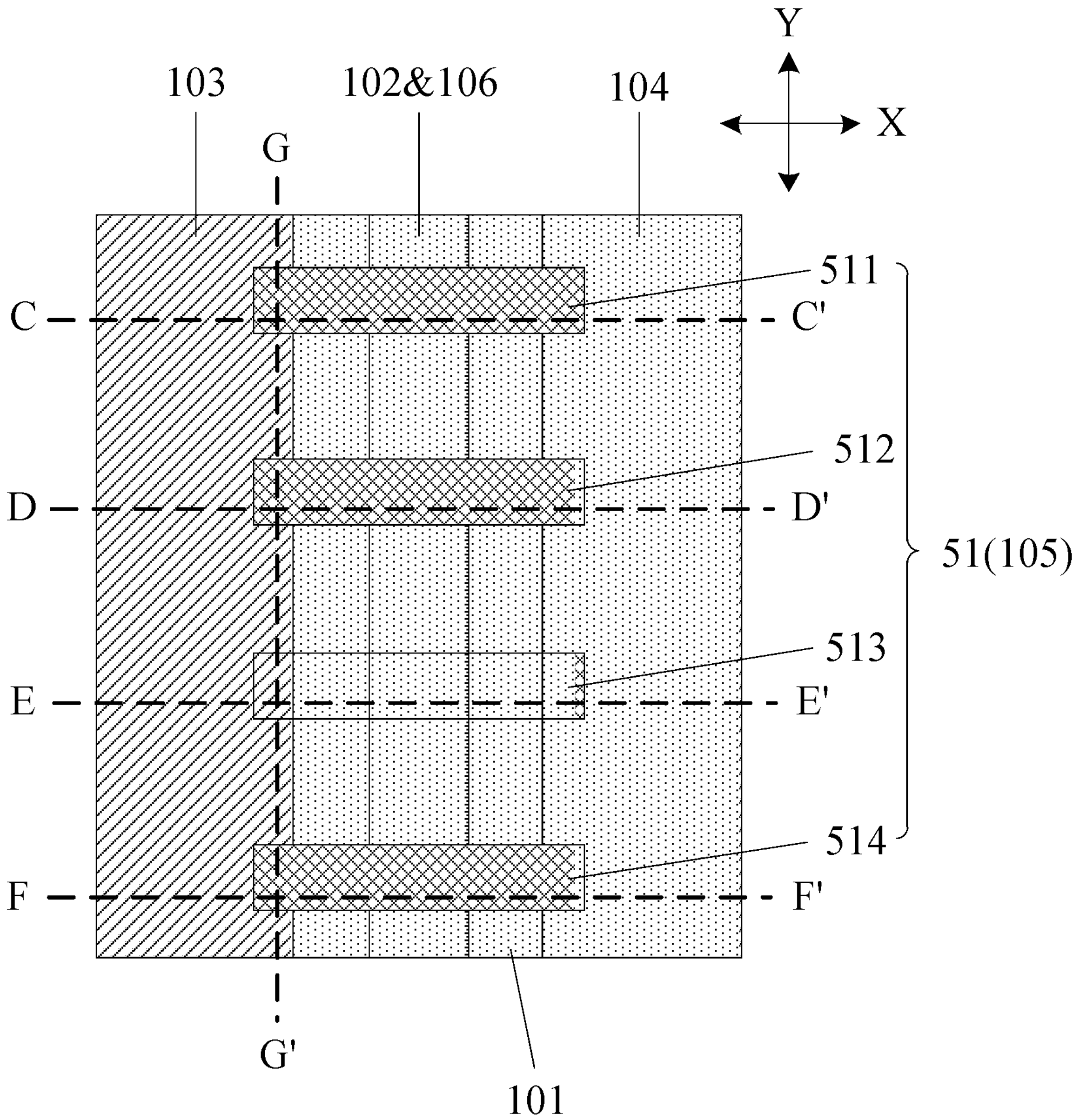
FIG. 9 is yet another schematic structural diagram of a phase shifter provided by an embodiment of the present disclosure.
Figure 10:
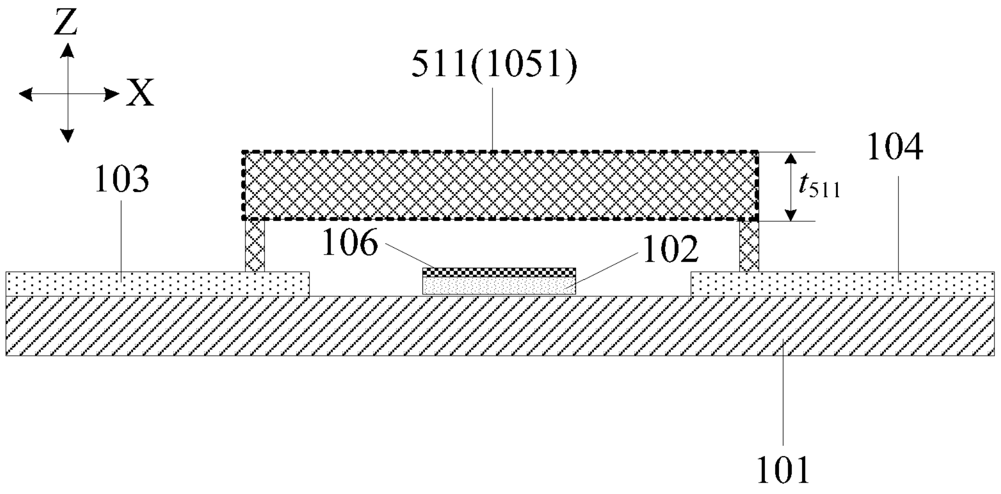
FIG. 10 is a cross-sectional view along a line C-C' in FIG. 9.
Figure 11:
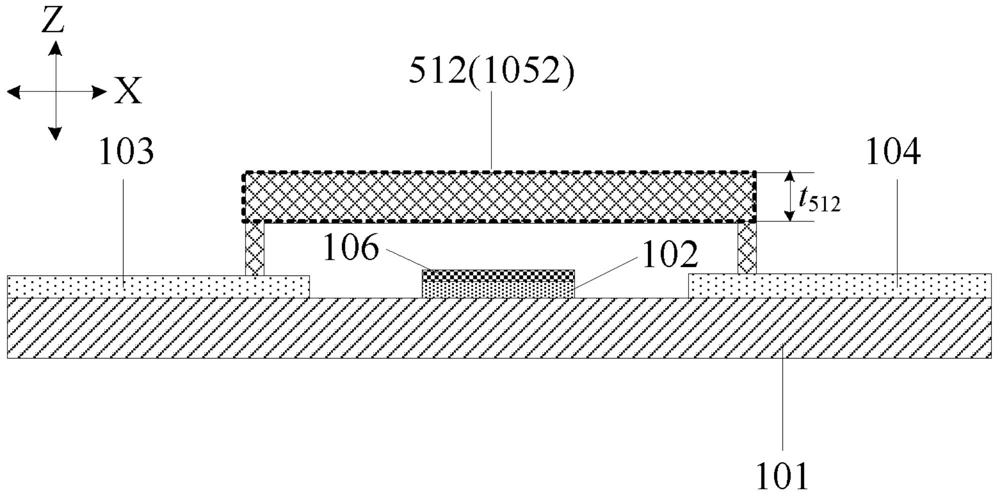
FIG. 11 is a cross-sectional view along a line D-D' in FIG. 9.
Figure 12:
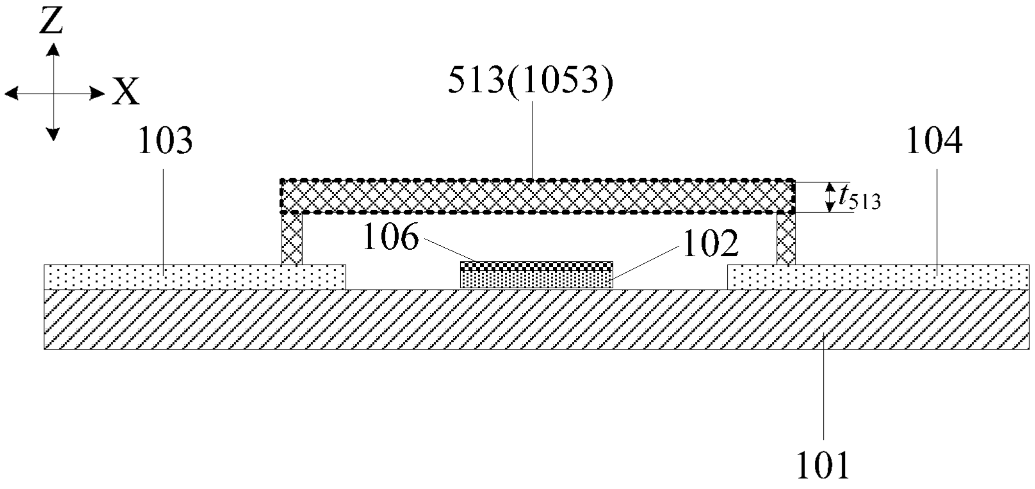
FIG. 12 is a cross-sectional view along a line E-E' in FIG. 9.
Figure 13:
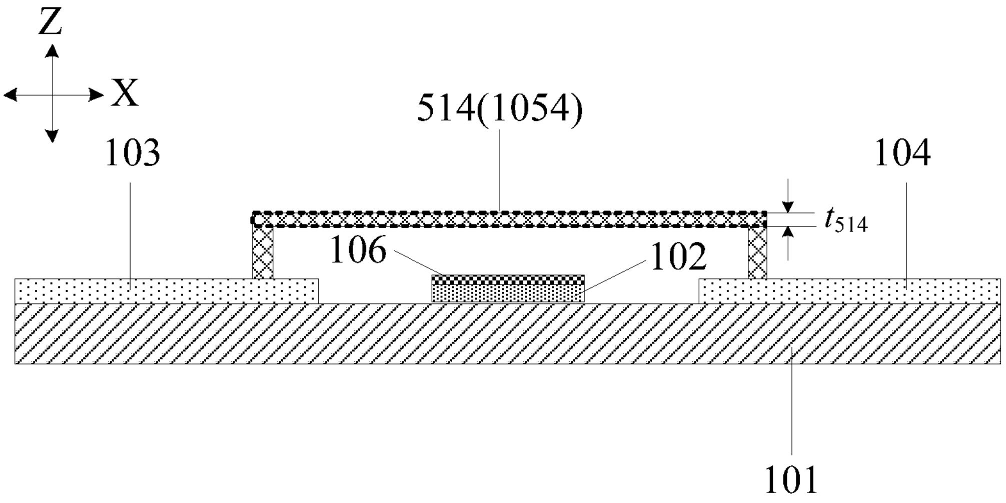
FIG. 13 is a cross-sectional view along a line F-F' in FIG. 9.
Figure 14:
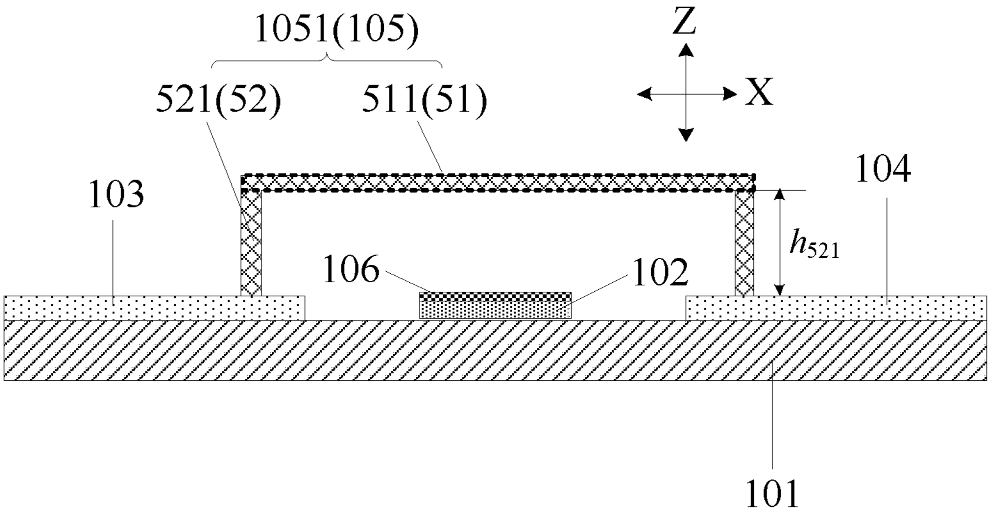
FIG. 14 is another cross-sectional view along a line C-C' in FIG. 9.
Figure 15:
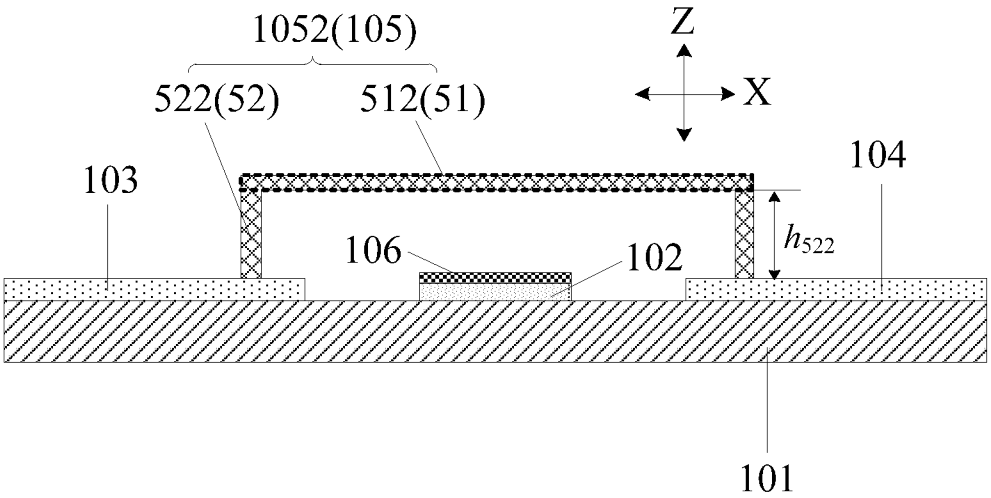
FIG. 15 is another cross-sectional view along a line D-D' in FIG. 9.
Figure 16:
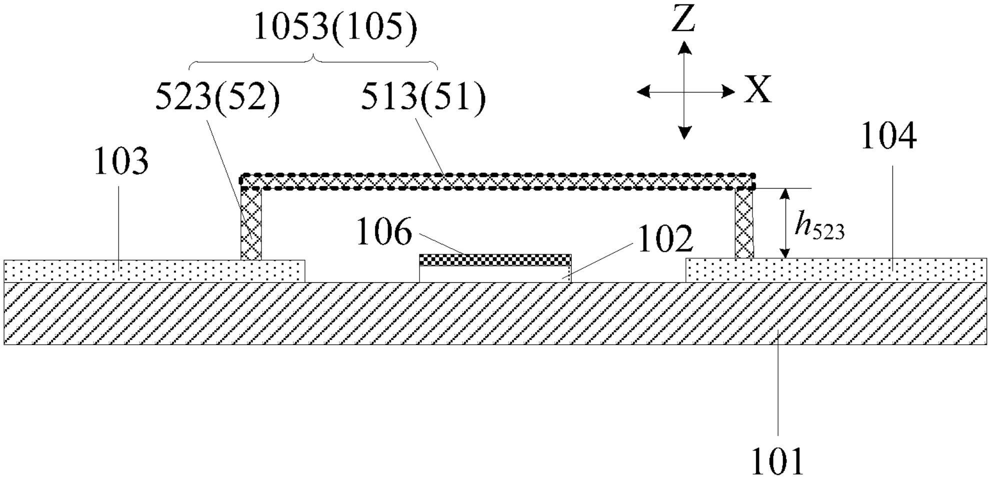
FIG. 16 is another cross-sectional view along a line E-E' in FIG. 9.
Figure 17:
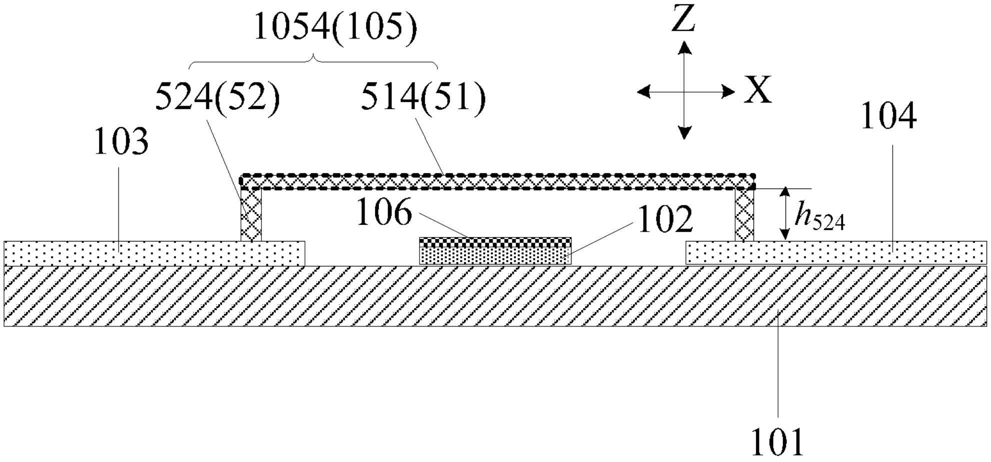
FIG. 17 is another cross-sectional view along a line F-F' in FIG. 9.
Figure 18:
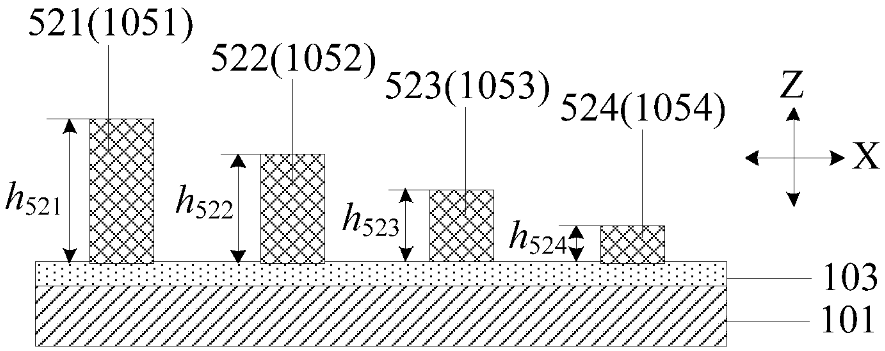
FIG. 18 is a cross-sectional view along a line G-G' in FIG. 9.

In the above phase shifter provided by embodiments of the present disclosure, as shown in FIG. 8, it may further be set that lengths of at least part of the bridge portions 51 in an extension direction X of the bridge portions 51 are different. Optionally, the lengths of all bridge portions 51 in the extension direction X of the bridge portions 51 are all different, so as to make the bending stiffness of different bridge portions 51 different. Specifically, in a case that only the length of the bridge portions 51 is a variable, the bending stiffness of the bridge portions 51 is lesser with respect to the lengths thereof, and the critical bias voltages controlling the bending of the bridge portions 51 to the signal transmission line 102 are lesser with respect to the lengths of the bridge portions 51.

In some embodiments, the lengths of the bridge portions 51 with different lengths arranged sequentially in the extension direction Y of the signal transmission line 102 may change monotonously. For example, in FIG. 8, a length $l_{511}$ of the first bridge portion 511, a length $l_{512}$ of the second bridge portion 512, a length $l_{513}$ of the third bridge portion 513 and a length $l_{514}$ of the fourth bridge portion 514 may decrease sequentially (it is equivalent to that the length $l_{514}$ of the fourth bridge portion 514, the length $l_{513}$ of the third bridge portion 513, the length $l_{512}$ of the second bridge portion 512 and the length $l_{511}$ of the first bridge portion 511 may increase sequentially). Accordingly, the bending stiffness of the first bridge portion 511, the bending stiffness of the second bridge portion 512, the bending stiffness of the third bridge portion 513 and the bending stiffness of the fourth bridge portion 514 increase sequentially, and the critical bias voltage corresponding to the first bridge portion 511, the critical bias voltage corresponding to the second bridge portion 512, the critical bias voltage corresponding to the third bridge portion 513 and the critical bias voltage corresponding to the fourth bridge portion 514 increase sequentially. During specific implementation, with the increase of the bias voltage on the signal transmission line 102, the first capacitance bridge 1051, the second capacitance bridge 1052, the third capacitance bridge 1053 and the fourth capacitance bridge 1054 sequentially generate pull-down drive responses.

Optionally, as shown in FIG. 8, a ratio of the lengths of the two adjacent bridge portions 51 with different lengths is greater than or equal to 6/5 or smaller than or equal to 5/6. For example, the length $l_{511}$ of the first bridge portion 511 may be greater than or equal to 6/5 times the length $l_{512}$ of the second bridge portion 512 (it is equivalent to that the length $l_{512}$ of the second bridge portion 512 may be smaller than or equal to 5/6 of the length $l_{511}$ of the first bridge portion 511), the length $l_{512}$ of the second bridge portion 512 may be greater than or equal to 6/5 times the length $l_{513}$ of the third bridge portion 513 (it is equivalent to that the length $l_{513}$ of the third bridge portion 513 may be smaller than or equal to 5/6 of the length $l_{512}$ of the second bridge portion 512), and the length $l_{513}$ of the third bridge portion 513 may be greater than or equal to 6/5 times the length $l_{514}$ of the fourth bridge portion 514 (it is equivalent to that the length $l_{514}$ of the fourth bridge portion 514 may be smaller than or equal to 5/6 of the length 1513 of the third bridge portion 513).

In some embodiments, as shown in FIG. 8, the length $l_{514}$ of the shortest fourth bridge portion 514 may be greater than or equal to 100 μm, and the length $l_{511}$ of the longest first bridge portion 511 may be smaller than or equal to 200 μm. For example, the length $l_{514}$ of the fourth bridge portion 514 is equal to 100 μm, the length $l_{513}$ of the third bridge portion 513 is equal to 120 μm, the length $l_{512}$ of the second bridge portion 512 is equal to 144 μm, and the length $l_{511}$ of the first bridge portion 511 is equal to 172.8 μm; the length $l_{514}$ of the fourth bridge portion 514 is equal to 105 μm, the length $l_{513}$ of the third bridge portion 513 is equal to 126 μm, the length $l_{512}$ of the second bridge portion 512 is equal to 151.2 μm, and the length $l_{511}$ of the first bridge portion 511 is equal to 181.44 μm; the length $l_{514}$ of the fourth bridge portion 514 is equal to 110 μm, the length $l_{513}$ of the third bridge portion 513 is equal to 132 μm, the length $l_{512}$ of the second bridge portion 512 is equal to 158.4 μm, and the length $l_{511}$ of the first bridge portion 511 is equal to 190.08 μm; and the length $l_{514}$ of the fourth bridge portion 514 is equal to 115 μm, the length $l_{513}$ of the third bridge portion 513 is equal to 138 μm, the length $l_{512}$ of the second bridge portion 512 is equal to 165.6 μm, and the length $l_{511}$ of the first bridge portion 511 is equal to 198.72 μm.

In the above phase shifter provided by embodiments of the present disclosure, as shown in FIG. 9 to FIG. 13, it may further be set that thicknesses of the at least part of the bridge portions 51 in a direction Z perpendicular to the substrate 101 are different. Specifically, in a case that only the thickness of the bridge portions 51 is a variable, the bending stiffness of the bridge portions 51 is greater with respect to the thicknesses thereof, and the critical bias voltages controlling the bending of the bridge portions 51 to the signal transmission line 102 are greater with respect to the thicknesses of the bridge portions 51.

In some embodiments, the thicknesses of the bridge portions 51 with different thicknesses arranged sequentially in the extension direction of the signal transmission line 102 may change monotonously. For example, in FIG. 9 to FIG. 13, a thickness $t_{511}$ of the first bridge portion 511, a thickness $t_{512}$ of the second bridge portion 512, a thickness $t_{513}$ of the third bridge portion 513 and a thickness $t_{514}$ of the fourth bridge portion 514 may decrease sequentially (it is equivalent to that the thickness $t_{514}$ of the fourth bridge portion 514, the thickness $t_{513}$ of the third bridge portion 513, the thickness $t_{512}$ of the second bridge portion 512 and the thickness $t_{511}$ of the first bridge portion 511 increase sequentially). Accordingly, the bending stiffness of the first bridge portion 511, the bending stiffness of the second bridge portion 512, the bending stiffness of the third bridge portion 513 and the bending stiffness of the fourth bridge portion 514 decrease sequentially, and the critical bias voltage corresponding to the first bridge portion 511, the critical bias voltage corresponding to the second bridge portion 512, the critical bias voltage corresponding to the third bridge portion 513 and the critical bias voltage corresponding to the fourth bridge portion 514 decrease sequentially. During specific implementation, with the increase of the bias voltage on the signal transmission line 102, the fourth capacitance bridge 1054, the third capacitance bridge 1053, the second capacitance bridge 1052 and the first capacitance bridge 1051 sequentially generate pull-down drive responses.

Optionally, as shown in FIG. 9 to FIG. 13, a ratio of the thicknesses of the two adjacent bridge portions 51 with different thicknesses may be greater than or equal to 11/10 or smaller than or equal to 10/11. For example, the thickness $t_{511}$ of the first bridge portion 511 may be greater than or equal to 11/10 times the thickness $t_{512}$ of the second bridge portion 512 (it is equivalent to that the thickness $t_{512}$ of the second bridge portion 512 may be smaller than or equal to 10/11 of the thickness $t_{511}$ of the first bridge portion 511), the thickness $t_{512}$ of the second bridge portion 512 may be greater than or equal to 11/10 times the thickness $t_{513}$ of the third bridge portion 513 (it is equivalent to that the thickness $t_{513}$ of the third bridge portion 513 may be smaller than or equal to 10/11 of the thickness $t_{512}$ of the second bridge portion 512), and the thickness $t_{513}$ of the third bridge portion 513 may be greater than or equal to 11/10 times the thickness $t_{514}$ of the fourth bridge portion 514 (it is equivalent to that the thickness $t_{514}$ of the fourth bridge portion 514 may be smaller than or equal to 10/11 of the thickness $t_{513}$ of the third bridge portion 513).

In some embodiments, as shown in FIG. 9 to FIG. 13, the thickness $t_{514}$ of the thinnest fourth bridge portion 514 may be greater than or equal to 0.3 μm, and the thickness $t_{511}$ of the thickest first bridge portion 511 may be smaller than or equal to 5 μm. For example, the thickness $t_{514}$ of the fourth bridge portion 514 is equal to 0.3 μm, the thickness $t_{513}$ of the third bridge portion 513 is equal to 0.33 μm, the thickness $t_{512}$ of the second bridge portion 512 is equal to 0.36 μm, and the thickness $t_{511}$ of the first bridge portion 511 is equal to 0.4 μm; the thickness $t_{514}$ of the fourth bridge portion 514 is equal to 0.5 μm, the thickness $t_{513}$ of the third bridge portion 513 is equal to 0.55 μm, the thickness $t_{512}$ of the second bridge portion 512 is equal to 0.61 μm, and the thickness $t_{511}$ of the first bridge portion 511 is equal to 0.67 μm; the thickness $t_{514}$ of the fourth bridge portion 514 is equal to 1 μm, the thickness $t_{513}$ of the third bridge portion 513 is equal to 1.1 μm, the thickness $t_{512}$ of the second bridge portion 512 is equal to 1.21 μm, and the thickness $t_{511}$ of the first bridge portion 511 is equal to 1.33 μm; the thickness $t_{514}$ of the fourth bridge portion 514 is equal to 2 μm, the thickness $t_{513}$ of the third bridge portion 513 is equal to 2.2 μm, the thickness $t_{512}$ of the second bridge portion 512 is equal to 2.42 μm, and the thickness $t_{511}$ of the first bridge portion 511 is equal to 2.66 μm; the thickness $t_{514}$ of the fourth bridge portion 514 is equal to 3 μm, the thickness $t_{513}$ of the third bridge portion 513 is equal to 3.3 μm, the thickness $t_{512}$ of the second bridge portion 512 is equal to 3.63 μm, and the thickness $t_{511}$ of the first bridge portion 511 is equal to 3.99 μm; and the thickness $t_{514}$ of the fourth bridge portion 514 is equal to 3.75 μm, the thickness $t_{513}$ of the third bridge portion 513 is equal to 4.13 μm, the thickness $t_{512}$ of the second bridge portion 512 is equal to 4.54 μm, and the thickness $t_{511}$ of the first bridge portion 511 is equal to 4.99 μm.

In the above phase shifter provided by embodiments of the present disclosure, as shown in FIG. 14 to FIG. 18, the capacitance bridges 105 may further include pier portions 52, the bridge portions 51 are connected with the first ground wire 103 and the second ground wire 104 respectively through the pier portions 52, in addition, it may be set that heights of the pier portions 52 of at least part of the capacitance bridges 105 in the direction Z perpendicular to the substrate 101 are different. Optionally, the heights of the pier portions 52 of all capacitance bridges 105 are all different, so that the capacitance bridges 105 correspond to different critical bias voltages. Specifically, in a case that only the height of the pier portions 52 is a variable, the bending stiffness of the bridge portions 51 is not correlated with the heights of the pier portions 52, and the critical bias voltages controlling the bending of the bridge portions 51 to the signal transmission line 102 are greater with respect to the heights of the pier portions 52.

In some embodiments, the heights of the pier portions 52 with different heights arranged sequentially in the extension direction Y of the signal transmission line 102 may change monotonously. For example, in FIG. 14 to FIG. 18, the pier portions 52 contained in the first capacitance bridge 1051, the second capacitance bridge 1052, the third capacitance bridge 1053 and the fourth capacitance bridge 1054 are respectively marked as a first pier portion 521, a second pier portion 522, a third pier portion 523 and a fourth pier portion 524. Optionally, a height $h_{521}$ of the first pier portion 521, a height $h_{522}$ of the second pier portion 522, a height $h_{523}$ of the third pier portion 523 and a height $h_{524}$ of the fourth pier portion 524 may decrease sequentially (it is equivalent to that the height $h_{524}$ of the fourth pier portion 524, the height $h_{523}$ of the third pier portion 523, the height $h_{522}$ of the second pier portion 522 and the height $h_{521}$ of the first pier portion 521 may increase sequentially). Accordingly, the critical bias voltage corresponding to the first capacitance bridge 1051, the critical bias voltage corresponding to the second capacitance bridge 1052, the critical bias voltage corresponding to the third capacitance bridge 1053 and the critical bias voltage corresponding to the fourth capacitance bridge 1054 decrease sequentially. During specific implementation, with the increase of the bias voltage on the signal transmission line 102, the fourth capacitance bridge 1054, the third capacitance bridge 1053, the second capacitance bridge 1052 and the first capacitance bridge 1051 sequentially generate pull-down drive responses.

Optionally, as shown in FIG. 14 to FIG. 18, a ratio of the heights of the two adjacent pier portions 52 with different heights may be greater than or equal to 6/5 or smaller than or equal to 5/6. For example, the height $h_{521}$ of the first pier portion 521 may be greater than or equal to 6/5 times the height $h_{522}$ of the second pier portion 522 (it is equivalent to that the height $h_{522}$ of the second pier portion 522 may be smaller than or equal to 5/6 of the height $h_{521}$ of the first pier portion 521), the height $h_{522}$ of the second pier portion 522 may be greater than or equal to 6/5 times the height $h_{523}$ of the third pier portion 523 (it is equivalent to that the height $h_{523}$ of the third pier portion 523 may be smaller than or equal to 5/6 of the height $h_{522}$ of the second pier portion 522), and the height $h_{523}$ of the third pier portion 523 may be greater than or equal to 6/5 times the length $l_{524}$ of the fourth bridge portion 524 (it is equivalent to that the height $h_{524}$ of the fourth pier portion 524 may be smaller than or equal to 5/6 of the height $h_{523}$ of the third pier portion 523).

In some embodiments, as shown in FIG. 14 to FIG. 18, the height $h_{524}$ of the shortest fourth pier portion 524 may be greater than or equal to 1 μm, and the height $h_{521}$ of the tallest first pier portion 521 may be smaller than or equal to 5 μm. For example, the height $h_{524}$ of the fourth pier portion 524 is equal to 1 μm, the height $h_{523}$ of the third pier portion 523 is equal to 1.2 μm, the height $h_{522}$ of the second pier portion 522 is equal to 1.44 μm, and the height $h_{521}$ of the first pier portion 521 is equal to 1.73 μm; the height $h_{524}$ of the fourth pier portion 524 is equal to 2 μm, the height $h_{523}$ of the third pier portion 523 is equal to 2.4 μm, the height $h_{522}$ of the second pier portion 522 is equal to 2.88 μm, and the height $h_{521}$ of the first pier portion 521 is equal to 3.46 μm; and the height $h_{524}$ of the fourth pier portion 524 is equal to 2.85 μm, the height $h_{523}$ of the third pier portion 523 is equal to 3.42 μm, the height $h_{522}$ of the second pier portion 522 is equal to 4.1 μm, and the height $h_{521}$ of the first pier portion 521 is equal to 4.92 μm.

It can be seen from the above content that by adjusting the hollowed-out areas, materials, widths, lengths and thicknesses of the bridge portions 51 or the heights of the pier portions 52 contained in the capacitance bridges 105, the critical bias voltages corresponding to the different capacitance bridges 105 may be different. Of course, in some embodiments, by adjusting at least two factors in the hollowed-out areas, materials, widths, lengths and thicknesses of the bridge portions 51 or the heights of the pier portions 52 contained in the capacitance bridges 105, the critical bias voltages corresponding to the different capacitance bridges 105 are different, which is not limited here.

In the above phase shifter provided by embodiments of the present disclosure, the bridge portions 51 and the pier portions 52 of the same capacitance bridge 105 may be integrally arranged. In this way, the process of making the pier portions 52 separately may be saved, and a connection effect of the pier portions 52 and the bridge portions 51 is ensured. Of course, in some embodiments, the pier portions 52 may also be independently arranged relative to the bridge portions 51, which is not limited here.

In the above phase shifter provided by embodiments of the present disclosure, the signal transmission line 102, the first ground wire 103 and the second ground wire 104 are arranged on the same layer, and the signal transmission line 102, the first ground wire 103 and the second ground wire 104 may be made by adopting the same film layer and the same mask process, so as to improve a production efficiency and reduce a production cost.

In the above phase shifter provided by embodiments of the present disclosure, as shown in FIG. 3, and FIG. 10 to FIG. 17, may further include an isolation layer 106 located between the layer where the signal transmission line 102 is located and a layer where the plurality of capacitance bridges 105 are located, an orthographic projection of the isolation layer 106 on the substrate 101 may approximately coincide with the orthographic projection of the signal transmission line 102 on the substrate 101, that is, the orthographic projections of the two exactly coincide with each other or are within an error range caused by manufacture, measurement and other factors. The isolation layer 106 may avoid short circuit between the signal transmission line 102 and the capacitance bridges 105 when a MEMS switch is in the off-state.

In the above phase shifter provided by embodiments of the present disclosure, the substrate 101 may be a flexible substrate to be applied in a bending deformation scene. In some embodiments, the substrate 101 may also be a rigid substrate, which is not limited here.

Based on the same inventive concept, an embodiment of the present disclosure provides a communication apparatus, including the above phase shifter provided by embodiments of the present disclosure. Since the principle of solving the problem of the communication apparatus is similar to that of the above phase shifter, the implementation of the communication apparatus provided by embodiments of the present disclosure may refer to the implementation of the above phase shifter provided by embodiments of the present disclosure, and will not be repeated.

In the above communication apparatus provided by embodiments of the present disclosure may be a terminal device. The terminal device is a device having a wireless receiving and sending function, and may be deployed on the land, such as being deployed indoors or outdoors, and being handheld, worn or vehicle-mounted, may be deployed on water surfaces, such as ships, and may be further deployed in the air, such as airplanes, balloons and satellites. The terminal device may be a mobile phone, a pad, a computer with a wireless receiving and sending function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home and the like. The terminal device may sometimes be called user equipment (UE), an access terminal device, a UE unit, a UE station, a mobile station, a mobile platform, a remote station, a remote terminal device, a mobile device, a UE terminal device, a terminal device, a wire communication device, a UE agent or UE apparatus and the like.

In the above terminal device provided by the present disclosure may include a processor for controlling audio/video and logic functions of the terminal device. For example, the processor may include a digital signal processor, a microprocessor, an analog-to-digital converter, a digital-to-analog converter, an internal voice coder (VC), an internal data modem (DM) and the like. In addition, the processor may include a function to operate one or more software programs, which may be stored in a memory. The processor and stored software instructions may generally be configured to enable the terminal device to perform actions, for example, the processor can operate a connection program.

In the above terminal device provided by embodiments of the present disclosure may further include a user interface, which may include a headset or speaker, a microphone, an output apparatus (such as a display), an input apparatus (such as a keypad, a touch screen and a joystick) and the like, and the user interface is operatively coupled to the processor. Accordingly, the processor may include a user interface circuit, which is configured to at least control some functions of one or more elements (such as the speaker, the microphone and the display) of the user interface. The user interface circuit may be configured to control one or more functions of one or more elements of the user interface through computer program instructions (such as software and/or firmware) stored in a memory accessible to the processor. Although not shown, the terminal device may further include a battery for supplying power to various circuits related to a mobile device, such as a circuit providing mechanical vibration as a detectable output.

In the above terminal device provided by embodiments of the present disclosure may further include one or more connection circuit modules for sharing and/or obtaining data. For example, the terminal device may include a short-range radio-frequency transceiver and/or a detector, so that the data may be shared with and/or obtained from an electronic device according to a radio-frequency technology. In some embodiments, the terminal device may further include other short-range transceivers, such as an infrared (IR) transceiver, a Bluetooth transceiver and a wireless universal serial bus (USB) transceiver. The Bluetooth transceiver can operate according to a low-power or ultra-low-power Bluetooth technology. At this time, the terminal device can send and/or receive data to and/or from the electronic device near it (such as within 10 meters). In some embodiments, the terminal device can send and/or receive the data to and/or from the electronic device according to various wireless networking technologies. Optionally, the wireless networking technologies include Wi-Fi, Wi-Fi low-power and WLAN technologies, such as an IEEE 802.11 technology, an IEEE 802.15 technology and an IEEE 802.16 technology.

In the above terminal device provided by embodiments of the present disclosure may further include a memory that may store information elements related to mobile users, such as a subscriber identity module (SIM). Optionally, the terminal device may further include other removable and/or fixed memories. Optionally, the terminal device may further include a volatile memory and/or non-volatile memory. The volatile memory may include a random access memory (RAM), which includes a dynamic random access memory and/or a static random access memory, an on-chip and/or off-chip cache memory and the like. The non-volatile memory may be embedded and/or removable, and may include a read-only memory, a flash memory, a magnetic storage device, such as a hard disk, a floppy disk drive, a magnetic tape, an optical disk drive and/or media. Similar to the volatile memory, the non-volatile memory may include a cache region for temporary storage of data. At least part of the volatile and/or non-volatile memory may be embedded in a processor. The memory may store one or more software programs, instructions, information blocks, data, etc., which may be used by the terminal device to perform the functions of the mobile terminal. For example, the memory may include an identifier that can uniquely identify the terminal device, such as an international mobile equipment identification (IMEI) code.

In the above communication apparatus provided by embodiments of the present disclosure may further be a network device, including but not limited to: a NodeB, an eNodeB, a base station in the fifth generation (5G) communication system, a base station in a future communication system, an access node in a WiFi system, a wireless relay node, a wireless return node, a wireless controller in a cloud radio access network (RAN) scene, a small station, a transmission node (TRP) and the like.

Although the present disclosure has been described in conjunction with specific features and the embodiments, obviously, various modifications and combinations may be made without departing from the spirit and scope of the present disclosure. In this way, if these modifications and variations of the present disclosure fall within the scope of the claims of the present disclosure and equivalent technologies thereof, the present disclosure is also intended to include these modifications and variations. Accordingly, this specification and the accompanying drawings are only illustrative descriptions of the present disclosure as defined in the appended claims, and are considered to have covered any and all modifications, changes, combinations or equivalents within the scope of the present disclosure.

What is claimed is:

1. A phase shifter, comprising:

a substrate;

a signal transmission line on one side of the substrate;

a first ground wire and a second ground wire on the one side of the substrate, wherein the first ground wire and the second ground wire are on two sides of the signal transmission line separately; and a plurality of capacitance bridges on a side facing away from the substrate, of a layer where the signal transmission line is, wherein the plurality of capacitance bridges are connected with the first ground wire and the second ground wire respectively, the plurality of capacitance bridges span the signal transmission line and are sequentially arrayed in an extension direction of the signal transmission line; there is a gap between the plurality of capacitance bridges and the signal transmission line in a direction perpendicular to the substrate, and critical bias voltages are different in a case that a value of a capacitance between each of the plurality of capacitance bridges and the signal transmission line reaches a maximum;

wherein each of the plurality of capacitance bridges comprises a bridge portion, the bridge portion spans the signal transmission line, at least parts of bridge portions comprise different bending stiffness, and the higher the bending stiffness of the bridge portions are, the higher the critical bias voltages corresponding to the plurality of capacitance bridges are.

2. The phase shifter of claim 1, wherein Young's modulus of materials used for at least part of the capacitance bridges is different; and with the greater the Young's modulus of the materials used for the capacitance bridges is, the higher the bending stiffness of the bridge portions is, and the greater the Young's modulus of the materials used for the capacitance bridges, the higher the critical bias voltages corresponding to the capacitance bridges are.

3. The phase shifter according to claim 2, wherein the Young's modulus of the materials used for the at least part of the capacitance bridges which are sequentially arrayed in the extension direction of the signal transmission line changes monotonously.

4. The phase shifter according to claim 1, wherein the at least part of the bridge portions respectively comprises at least one hollowed-out structure, and total hollowed-out areas of the hollowed-out structures contained in the at least part of the bridge portions are different with each other; and the bending stiffness of the at least part of the bridge portions is lesser with respect to the total hollowed-out areas of the at least part of the bridge portions, and the critical bias voltages corresponding to the capacitance bridges are lesser with respect to the total hollowed-out areas of the bridge portions.

5. The phase shifter according to claim 4, wherein the total hollowed-out areas of the at least part of the bridge portions which are sequentially arrayed in the extension direction of the signal transmission line change monotonously.

6. The phase shifter according to claim 4, wherein in the extension direction of the signal transmission line, a width of each hollowed-out structure is smaller than or equal to 4/5 of a width of each bridge portion; and a length of each hollowed-out structure in an extension direction of the bridge portions is smaller than or equal to an interval between the signal transmission line and the first ground wire or the second ground wire.

7. The phase shifter according to claim 4, wherein an orthographic projection of each hollowed-out structure on the substrate does not overlap an orthographic projection of the signal transmission line on the substrate.

8. The phase shifter according to claim 4, wherein one of the at least part of the bridge portions is not provided with the hollowed-out structure, and other ones of the at least part of the bridge portions are provided with the hollowed-out structures.

9. The phase shifter according to claim 1, wherein the bending stiffness of the at least part of the bridge portions which are sequentially arrayed in the extension direction of the signal transmission line changes monotonously.

10. The phase shifter according to claim 1, wherein the capacitance bridges comprise bridge portions and pier portions, the bridge portions are connected with the first ground wire and the second ground wire respectively through the pier portions, and heights of the pier portions of the at least part of the capacitance bridges in the direction perpendicular to the substrate are different; and the greater the heights of the pier portions are, the higher the critical bias voltages corresponding to the capacitance bridges are.

11. The phase shifter according to claim 10, wherein bridge portions and the pier portions of each of the plurality of capacitance bridges are integrally arranged.

12. The phase shifter according to claim 10, wherein the heights of the at least part of the pier portions which are sequentially arrayed in the extension direction of the signal transmission line change monotonously.

13. The phase shifter according to claim 1, wherein thicknesses of the at least part of the bridge portions in the direction perpendicular to the substrate are different; and the greater the thicknesses of the bridge portions are, the higher the bending stiffness of the bridge portions is, and the greater the thicknesses of the bridge portions are, the higher the critical bias voltages corresponding to the capacitance bridges are.

14. The phase shifter according to claim 13, wherein the thicknesses of the at least part of the bridge portions which are sequentially arrayed in the extension direction of the signal transmission line change monotonously.

15. The phase shifter according to claim 1, wherein widths of the at least part of the bridge portions in the extension direction of the signal transmission line are different; and the greater the widths of the bridge portions are, the higher the bending stiffness of the bridge portions is, and the greater the widths of the bridge portions are, the higher the critical bias voltages corresponding to the capacitance bridges are.

16. The phase shifter according to claim 15, wherein the widths of the at least part of the bridge portions which are sequentially arrayed in the extension direction of the signal transmission line change monotonously.

17. The phase shifter according to claim 1, wherein the signal transmission line, the first ground wire and the second ground wire are arranged on a same layer.

18. The phase shifter according to claim 1, further comprising an isolation layer between the layer where the signal transmission line is and a layer where the plurality of capacitance bridges are, wherein an orthographic projection of the isolation layer on the substrate approximately coincides with the orthographic projection of the signal transmission line on the substrate.

19. The phase shifter according to claim 1, wherein lengths of the at least part of the bridge portions in the extension direction of the bridge portions are different; and the less the lengths of the bridge portions are, the higher the bending stiffness of the bridge portions is, and the less the lengths of the bridge portions are, the higher the critical bias voltages corresponding to the capacitance bridges are.

20. The phase shifter according to claim 19, wherein the lengths of the at least part of the bridge portions which are sequentially arrayed in the extension direction of the signal transmission line change monotonously.

21. The phase shifter according to claim 1, wherein the substrate is a flexible substrate.

22. A communication apparatus, comprising the phase shifter according to claim 1.

* * * * *